United States Patent
Sano et al.

(10) Patent No.: US 9,680,142 B2
(45) Date of Patent: Jun. 13, 2017

(54) POLYOLEFIN MICROPOROUS MEMBRANE, SEPARATOR FOR NON-AQUEOUS SECONDARY BATTERY, NON-AQUEOUS SECONDARY BATTERY AND METHOD OF PRODUCING POLYOLEFIN MICROPOROUS MEMBRANE

(75) Inventors: Hiroki Sano, Iwakuni (JP); Satoshi Nishikawa, Iwakuni (JP); Takashi Yoshitomi, Iwakuni (JP)

(73) Assignee: TEIJIN LIMITED, Osaka (JP)

( * ) Notice: Subject to any disclaimer, the term of this patent is extended or adjusted under 35 U.S.C. 154(b) by 1394 days.

(21) Appl. No.: 13/382,607

(22) PCT Filed: Mar. 23, 2011

(86) PCT No.: PCT/JP2011/057042
§ 371 (c)(1),
(2), (4) Date: Jan. 6, 2012

(87) PCT Pub. No.: WO2011/118660
PCT Pub. Date: Sep. 29, 2011

(65) Prior Publication Data
US 2012/0115008 A1 May 10, 2012

(30) Foreign Application Priority Data

Mar. 23, 2010 (JP) .................................. 2010-066116
Mar. 23, 2010 (JP) .................................. 2010-066117

(51) Int. Cl.
  *H01M 2/16* (2006.01)
  *B29C 47/00* (2006.01)
  *B29C 47/88* (2006.01)

(52) U.S. Cl.
  CPC ....... *H01M 2/1653* (2013.01); *B29C 47/0021* (2013.01); *H01M 2/166* (2013.01); *H01M 2/1686* (2013.01); *B29C 47/8845* (2013.01); *B29C 47/8895* (2013.01)

(58) Field of Classification Search
None
See application file for complete search history.

(56) References Cited

U.S. PATENT DOCUMENTS

| | | | |
|---|---|---|---|
| 5,882,518 A * | 3/1999 | Yagi et al. | 210/500.36 |
| 5,993,954 A | 11/1999 | Radovanovic et al. | |
| 6,713,217 B2 * | 3/2004 | Oura et al. | 429/247 |
| 2002/0192560 A1 * | 12/2002 | Nishimura et al. | 429/252 |
| 2009/0008816 A1 | 1/2009 | Takita et al. | |

FOREIGN PATENT DOCUMENTS

| | | |
|---|---|---|
| CN | 101208198 A | 6/2008 |
| CN | 101208379 A | 6/2008 |
| CN | 101253232 A | 8/2008 |
| EP | 1153969 A1 | 11/2001 |
| JP | 11-130900 A | 5/1999 |
| JP | 2001-523284 A | 5/1999 |
| JP | 11-322988 A | 11/1999 |
| JP | 2000-017100 A | 1/2000 |
| JP | 2000-212321 A | 8/2000 |
| JP | 2000-313759 A | 11/2000 |
| JP | 2004-204163 A | 7/2004 |
| JP | 2005-209570 A | 8/2005 |
| JP | 2006-111712 A | 4/2006 |
| WO | WO 2006/104165 A1 | 10/2006 |
| WO | WO 2008/062727 A1 | 5/2008 |
| WO | WO 2008/156033 A1 | 12/2008 |

OTHER PUBLICATIONS

Chinese Office Action in corresponding Application No. 201180003117.X dated Nov. 5, 2013.
Communication dated Mar. 1, 2016, from the European Patent Office in counterpart European Application No. 11759465.5.

* cited by examiner

*Primary Examiner* — Sarah A Slifka
(74) *Attorney, Agent, or Firm* — Sughrue Mion, PLLC

(57) ABSTRACT

A polyolefin microporous membrane, the membrane having, when measured by DSC, a degree of crystallinity of from 65 to 85%, a lamellar crystal/crystal ratio of from 30 to 85%, a crystal length of from 5 nm to 50 nm and an amorphous length of from 3 nm to 30 nm, and a polyolefin microporous membrane, the membrane having, when measured by X-ray diffractometry, crystal size of from 12.5 nm to 13.5 nm and a degree of crystallinity of from 64 to 68%.

12 Claims, No Drawings

POLYOLEFIN MICROPOROUS MEMBRANE, SEPARATOR FOR NON-AQUEOUS SECONDARY BATTERY, NON-AQUEOUS SECONDARY BATTERY AND METHOD OF PRODUCING POLYOLEFIN MICROPOROUS MEMBRANE

CROSS REFERENCE TO RELATED APPLICATION

This application is a National Stage of International Application No. PCT/JP2011/057042 filed on Mar. 23, 2011, claiming priority based on Japanese Patent Application Nos. 2010-066116 and JP 2010-066117, filed Mar. 23, 2010, the contents of all of which are incorporated herein by reference in their entirety.

TECHNICAL FIELD

The present invention relates to a polyolefin microporous membrane, and particularly to a technique for improving the safety and battery properties of a non-aqueous secondary battery.

BACKGROUND ART

Since a lithium ion secondary battery in which a lithium-containing transition metal oxide such as lithium cobaltate is used as a positive electrode, and carbon material which is capable of doping and dedoping lithium is used as a negative electrode, has a high energy density, it is prevalent as a power source for portable electronic appliances represented by a cellular phone. As a power source mounted on a hybrid vehicle, a lithium ion secondary battery having a high energy density is also attracting attention. Along with the popularization of portable electronic appliances and hybrid vehicles, demand for lithium ion secondary batteries is ever-increasing.

A lithium ion secondary battery generally includes a laminated body of a positive electrode, a separator containing an electrolyte, and a negative electrode. A principal function of the separator is to prevent a short circuit between the positive electrode and the negative electrode. The separator is required to have properties such as lithium ion permeability, mechanical strength and durability.

At present, as a film suitable for a separator for a lithium ion secondary battery, a large number of polyolefin microporous membranes have been proposed. Since a polyolefin microporous membrane satisfies the above-mentioned properties and has a shutdown function, it is widely used for a separator for a lithium ion secondary battery. In the field of non-aqueous secondary batteries, the shutdown function means a function in which, when the temperature of the battery abnormally increases, polyolefin melts and holes of a porous membrane are blocked, thereby blocking an electric current, and the shutdown function works for preventing thermal runaway of the battery.

However, even when the shutdown function works and the electric current is temporarily blocked, when the temperature inside the battery increases above the melting point of polyolefin constituting a microporous membrane, the whole polyolefin microporous membrane melts (i.e., melt-down). As a result, a short circuit occurs inside the battery, by which a large amount of heat is generated, and the battery may emit smoke, catch fire or explode. For this reason, the separator is required to have, in addition to the shutdown function, a heat resistance such that the separator does not melt down even at a temperature higher than the temperature at which a shutdown function is exerted.

Therefore, in Patent Document 1, a separator for a non-aqueous secondary battery is proposed in which the surface of a polyethylene microporous membrane is covered with a heat resistant porous layer including a heat resistant polymer such as a fully aromatic polyamide. In Patent Document 2, a separator for a non-aqueous secondary battery is proposed in which inorganic particulates such as alumina are contained in a heat resistant porous layer, to improve heat resistance as well as the shutdown function. In Patent Document 3, a separator for a non-aqueous secondary battery is proposed in which metal hydroxide particulates such as aluminum hydroxide are contained in a heat resistant porous layer, to improve flame resistance as well as heat resistance. In these separators for a non-aqueous secondary battery, both of the shutdown function and the heat resistance can be attained, and excellent effects can be expected in safety of the batteries.

However, in the separator for a non-aqueous secondary battery which has the structure in which a polyolefin microporous membrane is covered with a heat resistant porous layer, the shutdown function which the polyolefin microporous membrane exhibits tends to be restrained. On the other hand, when the composition of the polyolefin microporous membrane is made such that flowability of the polyolefin is high in order to improve the shutdown function of the polyolefin microporous membrane, a problem arises in that the mechanical strength of the polyolefin microporous membrane decreases and, as a result, the mechanical strength of the separator for a non-aqueous secondary battery decreases.

Recently, from the viewpoint of increase in the capacity of a lithium ion secondary battery, a variety of high-capacity type positive electrode materials and negative electrode materials have been developed. However, in the high-capacity type positive and negative electrode materials, volume change during charging and discharging is relatively large and, as described below, the battery properties may decrease depending on the volume change of the electrode.

Since the separator is disposed between the positive electrode and the negative electrode in the battery, a compressive force or a restoring force acts in the thickness direction of the separator due to expansion and shrinkage of the electrode accompanying charging and discharging of the battery. In the case of low-capacity type positive and negative electrode materials such as conventional lithium cobaltate or hard carbon, since the volume change of the electrode is small, the deformation of the separator in the thickness direction is also small, and the battery properties are not particularly affected. However, in the case of using an electrode material which has a large ratio of volume change during charging and discharging, the acting force from the electrode to the separator becomes large. Further, when the separator cannot follow the volume change of the electrode and the porous structure of the separator cannot recover from a compressed state, a phenomenon in which a sufficient amount of electrolyte cannot be retained in the holes of the separator, that is, a liquid depletion phenomenon may occur. This liquid depletion phenomenon may consequently deteriorate the repeated charging-discharging property (cycling property) of the battery.

In order to solve the above-mentioned liquid depletion problem, controlling of physical properties such as elasticity of the polyolefin microporous membrane may be thought of. However, when a certain physical property of the polyolefin microporous membrane is controlled, other physical properties are necessarily also affected. As described above, since good shutdown properties and mechanical strength are also demanded for the polyolefin microporous membrane, a technique in which these various properties can be improved with good balance is also demanded.

PRIOR ART DOCUMENTS

Patent Documents

Patent Document 1: Japanese Patent Application Laid-Open (JP-A) No. 2005-209570
Patent Document 2: International Publication WO2008/062727
Patent Document 3: International Publication WO2008/156033

SUMMARY OF INVENTION

Technical Problems

An object of the present invention is to provide a polyolefin microporous membrane with which, even when the polyolefin microporous membrane is complexed with a heat resistant porous layer, good mechanical strength and shutdown properties can be obtained and electrolyte depletion can be prevented.

Solution to Problems

In order to solve the above problems, the present inventors intensively studied, and as a result, they discovered that the above problems can be solved by the following constitutions, thereby arriving at the present invention.

<1> A polyolefin microporous membrane, the membrane having, when measured by DSC, a degree of crystallinity of from 65 to 85%, a lamellar crystal/crystal ratio of from 30 to 85%, a crystal length of from 5 nm to 50 nm and an amorphous length of from 3 nm to 30 nm.

<2> The polyolefin microporous membrane according to <1>, wherein the lamellar crystal/crystal ratio is from 40 to 80%, the crystal length is from 10 nm to 25 nm, and the amorphous length is from 3 nm to 10 nm.

<3> A polyolefin microporous membrane, the membrane having, when measured by X-ray diffractometry, a crystal size of from 12.5 nm to 13.5 nm and a degree of crystallinity of from 64 to 68%.

<4> The polyolefin microporous membrane according to any one of <1> to <3>, which comprises a polyolefin including an ultra-high molecular weight polyethylene having a weight-averaged molecular weight of 1,000,000 or higher and a high-density polyethylene having a density of 0.942 g/cm$^3$.

<5> The polyolefin microporous membrane according to any one of <1> to <4>, which is produced by a process of preparing a polyolefin solution by kneading from 1 to 35 parts by mass of polyolefin and from 65 to 99 parts by mass of mixed solvent including a volatile solvent and a nonvolatile solvent; a process of forming a gel composition by extruding the polyolefin solution through a die at a temperature equal to or greater than a melting point of the polyolefin and no more than 60° C. higher than the melting point of the polyolefin, followed by cooling at a cooling rate of from 30° C./min to 150° C./min; a process of removing the volatile solvent from the gel composition; a process of drawing the gel composition; and a process of removing the nonvolatile solvent from the gel composition.

<6> A separator for a non-aqueous secondary battery, the separator comprising: the polyolefin microporous membrane according to any one of <1> to <5>; and a heat resistant porous layer including a heat resistant resin disposed on one side or both sides of the polyolefin microporous membrane.

<7> The separator for a non-aqueous secondary battery according to <6>, wherein the heat resistant resin is at least one resin selected from the group consisting of fully aromatic polyamides, polyimides, polyamide imides, polysulfones, polyketones, polyetherketones, polyether imides and cellulose.

<8> The separator for a non-aqueous secondary battery according to <6> or <7>, wherein the heat resistant porous layer includes an inorganic filler.

<9> The separator for a non-aqueous secondary battery according to <8>, wherein the inorganic filler is aluminum hydroxide or magnesium hydroxide.

<10> A separator for a non-aqueous secondary battery, the separator comprising: the polyolefin microporous membrane according to any one of <1> to <5>; and an adhesive porous layer including a vinylidene fluoride resin disposed on one side or both sides of the polyolefin microporous membrane.

<11> The separator for a non-aqueous secondary battery according to <10>, wherein the vinylidene fluoride resin is at least one of (i) polyvinylidene fluoride; or (ii) a copolymer of a vinylidene fluoride and at least one of hexafluoropropylene, chlorotrifluoroethylene, hexafluoroethylene or ethylene.

<12> A non-aqueous secondary battery, the battery comprising a positive electrode, a negative electrode and the polyolefin microporous membrane or separator for a non-aqueous secondary battery according to any one of <1> to <11> disposed between the positive electrode and the negative electrode, wherein an electromotive force is obtained by doping and dedoping lithium.

<13> A method of producing a polyolefin microporous membrane, the method comprising: a process of preparing a polyolefin solution by kneading from 1 to 35 parts by mass of polyolefin and from 65 to 99 parts by mass of mixed solvent including a volatile solvent and a nonvolatile solvent; a process of forming a gel composition by extruding the polyolefin solution through a die at a temperature equal to or greater than a melting point of the polyolefin and no more than 60° C. higher than the melting point of the polyolefin, followed by cooling at a cooling rate of from 30° C./min to 150° C./min; a process of removing the volatile solvent from the gel composition; a process of drawing the gel composition; and a process of removing the nonvolatile solvent from the gel composition.

Advantageous Effects of the Invention

According to the present invention, it is possible to provide a polyolefin microporous membrane with which, even when the polyolefin microporous membrane is complexed with a heat resistant porous layer, good mechanical strength and shutdown properties can be obtained and electrolyte depletion can be prevented. According to the polyolefin microporous membrane of the present invention or a separator for a non-aqueous secondary battery in which the membrane is used, it is possible to improve the safety and battery properties of a non-aqueous secondary battery.

DESCRIPTION OF THE INVENTION

In the following, embodiments of the present invention is described. These description and Examples illustrate the present invention by examples and the scope of the present invention is not limited thereto.

The range of numerical value represented by "from A to B" means a range including A and B as the minimum value and the maximum value respectively.

<Polyolefin Microporous Membrane>

In the present invention, the term "microporous membrane" herein means a membrane which has a large number of micropores inside and has a structure in which these micropores are connected, wherein gases or liquids can pass from one side of the membrane to the other side of the membrane.

In a polyolefin microporous membrane of the present invention, the structure of polyolefin can be generally divided into an extended chain portion which is formed by an extended polymer chain, a lamellar crystal portion which is formed by a polymer chain which is folded and stacked in the molecule or intermolecularly and an amorphous portion (also referred to as "tie molecule") which freely moves and crosslinks between crystals such as lamellar crystal.

In a polyolefin microporous membrane of the present invention, one or more of the degree of crystallinity, the lamellar crystal/crystal ratio, the crystal length, the amorphous length and the crystal size may be referred to as a crystal parameter.

Polyolefin Microporous Membrane of First Embodiment

The polyolefin microporous membrane of the first embodiment of the present invention is a polyolefin microporous membrane which has, when measured by DSC (Differential Scanning calorimetry), the degree of crystallinity of from 65 to 85%, the lamellar crystal/crystal ratio of from 30 to 85%, the crystal length of from 5 nm to 50 nm and the amorphous length of from 3 nm to 30 nm.

The polyolefin microporous membrane has excellent mechanical strength such as thrust resistance. In the polyolefin microporous membrane, polyolefin flows at a high temperature and, thus, good shutdown properties can be obtained. The polyolefin microporous membrane has an appropriate degree of crystal structure, and hole shapes can sufficiently recover from repeated deformations generated by the volume change of an electrode during charge and discharge, thereby preventing electrolyte depletion. Since the polyolefin microporous membrane has an excellent mechanical strength, the thickness of the membrane can also be made small to reduce the membrane resistance, and the membrane has an excellent durability against repeated use.

In the polyolefin microporous membrane, as shown in the formula (1) below, the degree of crystallinity (%) obtained by DSC is the ratio of the melting energy measured by DSC to the theoretical melting energy of a crystal. In the present invention, as the theoretical melting energy, 289 J/g·K is employed.

(degree of crystallinity)={(melting energy measured by DSC)/(theoretical melting energy)}×100  Formula (1)

In the above formula (1), the melting energy measured by DSC means the sum of the melting energy of the extended chain and the melting energy of the lamellar crystal. The lamellar crystal normally melts at a temperature lower than the temperature in which the extended chain portion melts. Therefore, of the two peaks in the DSC chart, the peak on the lower temperature side represents a peak corresponding to the melting of the lamellar crystal and the peak on the higher temperature side represents a peak corresponding to the melting of the extended chain.

In the present invention, the sum of the melting energies at the two peaks in the DSC chart is defined as a melting energy measured by DSC. The ratio of the melting energy to the theoretical melting energy is the degree of crystallinity of the polyolefin obtained by DSC.

In the present invention, the sum of the melting energies at the two peaks in the DSC chart is defined as a melting energy measured by DSC. The ratio of the melting energy to the theoretical melting energy represents the degree of crystallinity of the polyolefin obtained by DSC.

In the present invention, the two peaks in the DSC chart are separated and the melting energy of the peak on the lower temperature side is divided by the sum of the melting energies of the two peaks to obtain the lamellar crystal/crystal ratio (%).

In the polyolefin microporous membrane, the crystal length means the crystal length of a lamellar crystal (size of one lamellar crystal), and is obtained by a Gibbs-Thomson's formula, which is shown as the following formula (2). As the surface energy of the crystal, $37.0 \times 10^{-3}$ J/m² is employed, and as the equilibrium melting point, 414.5 K is employed.

(crystal length)=2×(surface energy of crystal)/{(theoretical melting energy)/(1−melting point measured by DSC/equilibrium melting point)}  Formula (2)

In the polyolefin microporous membrane, the amorphous length is obtained by the following formula (3) by using the degree of crystallinity and the crystal length.

(amorphous length)=(crystal length)×(100/degree of crystallinity−1)  Formula (3)

In the polyolefin microporous membrane, the degree of crystallinity is from 65 to 85%.

When the degree of crystallinity becomes high, the melting point, the tensile strength and the thrust resistance of the polyolefin microporous membrane improve. On the other hand, the fact that the degree of crystallinity becomes high means that the amorphous portion decreases. Polymers have a portion where a part of the polymer is entangled, and the polymer chain entanglement is mainly formed in an amorphous portion. When the degree of crystallinity becomes high, the amorphous portion decreases and, as a result, the entanglement density in the amorphous portion becomes high. This amorphous portion is usually formed at the end of or on the side chain of the crystal portion, and an entanglement at the amorphous portion causes restraint between crystals. As a result, from the viewpoint of the mechanical strength, the entanglement leads to improvement of the thrust resistance. However, the restraint between crystals also causes an increase in the melting point, and causes decrease in the shutdown properties. From the above, the degree of crystallinity is from 65 to 85%, and preferably from 65 to 80%.

In the polyolefin microporous membrane, the lamellar crystal/crystal ratio is from 30 to 85%.

The tensile strength of the polyolefin microporous membrane is mainly attributed to the extended chain. In order to improve the tensile strength, it is preferred that the ratio of the extended chain be made large and the ratio of the lamellar crystal be made small. However, since the restraint between crystals by the amorphous portion is mainly the restraint between lamellar crystal, in order to obtain a certain degree of restraint between crystals, a certain ratio of lamellar crystal is required. From the above, the lamellar crystal/crystal ratio is from 30 to 85%, and preferably from 40 to 80%.

In the polyolefin microporous membrane, the crystal length is from 5 nm to 50 nm.

The crystal length means the size of one lamellar crystal. Since the lamellar crystal is involved in the entanglement between crystals, from the viewpoint of improvement of the thrust resistance, it is preferred that the number of the lamellar crystal be large. For this reason, the size of the lamellar crystal is preferably small. On the other hand, since the lamellar crystal and the amorphia are mutually in the equilibrium diffusion state, when much lamellar crystal exists, decrystallization due to the equilibrium diffusion easily occurs and the degree of crystallinity easily decreases by changes in the environment. It is thus preferred that the size of the lamellar crystal is large to some degree. When the size of lamellar crystal is large to some degree, a rapid fluidization due to the melting of polyolefin tends to occur, and tends to have a desired effect on the shutdown properties. From the above, the crystal length is from 5 nm to 50 nm, and preferably from 10 nm to 25 nm.

In the polyolefin microporous membrane, the amorphous length is from 3 nm to 30 nm.

The amorphous length means the size of one amorphous, and has an effect on the number of the amorphia. Since the polymer entanglement is generated in the amorphous portion, from the viewpoint of the thrust resistance, it is preferred that the number of amorphous portions be large. However, when the entanglement increases, the shutdown properties deteriorate. From the above, in order to control the number of the amorphia in an appropriate range, the amorphous length is from 3 nm to 30 nm, and preferably from 3 nm to 10 nm.

The polyolefin microporous membrane also has a good electrolyte depletion prevention effect when the degree of crystallinity is from 65 to 85%, the lamellar crystal/crystal ratio is from 30 to 85%, the crystal length is from 5 nm to 50 nm and the amorphous length is from 3 nm to 30 nm.

Polyolefin Microporous Membrane of Second Embodiment

The polyolefin microporous membrane of the second embodiment of the present invention has, when measured by X-ray diffractometry, a crystal size of from 12.5 nm to 13.5 nm and a degree of crystallinity of from 64 to 68%.

The polyolefin microporous membrane has excellent mechanical strengths such as thrust resistance. Further, the polyolefin flows at a high temperature and, thus good shutdown properties can be obtained. The polyolefin microporous membrane has an appropriate degree of crystal structure, and hole shapes can sufficiently recover from repeated deformations generated by the volume change of an electrode during charging and discharging, thereby preventing electrolyte depletion. Since the polyolefin microporous membrane has an excellent mechanical strength, the thickness of the membrane can also be made small to reduce the membrane resistance, and the membrane has an excellent durability against repeated use.

In the polyolefin microporous membrane, the crystal size of the polyolefin obtained by X-ray diffractometry is obtained by Scherrer's formula, which is shown as the following formula (4), using the half-width of a peak at 2θ=21.3 obtained by wide angle X-ray diffractometry.

(crystal size)=$(K\lambda)/(\beta_0 \cos \theta_B)$    Formula (4)

Here, K is 0.94, λ is an X-ray wavelength (0.1542 nm); $\beta_0$ is half-width×π/180; $\theta_B$ is a Bragg angle (2θ×π/360).

In the polyolefin microporous membrane, the degree of crystallinity (%) of the polyolefin obtained by X-ray diffractometry is the ratio of the sum of the integrated intensities of peaks at 2θ=about 21.3, about 23.7 and about 29.8 to the total integrated intensity, obtained by wide angle X-ray diffractometry.

In the polyolefin microporous membrane, the crystal size is 12.5 nm to 13.5 nm.

The crystal size means the size of one lamellar crystal. Since the lamellar crystal is involved in the entanglement between crystals, from the viewpoint of improvement of the thrust resistance, it is preferred that the number of the lamellar crystal be large. For this reason, the size of the lamellar crystal is preferably small. On the other hand, since the lamellar crystal and the amorphia are mutually in the equilibrium diffusion state, when much lamellar crystal exists, decrystallization due to the equilibrium diffusion easily occurs and the degree of crystallinity easily decreases by changes in the environment. It is thus preferred that the size of the lamellar crystal is large to some degree. When the size of lamellar crystal is large to some degree, a rapid fluidization due to the melting of polyolefin tends to occur, which tends to have a desired effect on the shutdown properties. From the above, the crystal size is from 12.5 nm to 13.5 nm.

In the polyolefin microporous membrane, the degree of crystallinity is from 64 to 68%.

When the degree of crystallinity becomes high, the melting point, the tensile strength and the thrust resistance of the polyolefin microporous membrane improve. On the other hand, that fact that the degree of crystallinity becomes high means that the amorphous portion decreases. Polymers have a portion where a part of the polymer is entangled, and the polymer entanglement is mainly formed in the amorphous portion. When the degree of crystallinity becomes high, the amorphous portion decreases and as a result, the entanglement density in the amorphous portion becomes high. This amorphous portion is usually formed at the end of or on the side chain of the crystal portion, and an entanglement at the amorphous portion causes restraints between crystals. As a result, from the viewpoint of the mechanical strength, the entanglement leads to improvement of the thrust resistance. However, the restraint between crystals also causes an increase in the melting point and causes decrease in the shutdown properties. From the above, the degree of crystallinity is from 64 to 68%.

The polyolefin microporous membrane also has a good electrolyte depletion prevention effect when the crystal size is from 12.5 nm to 13.5 nm and the degree of crystallinity is from 64 to 68%.

In the polyolefin microporous membranes of the first embodiment and the second embodiment of the present invention, a method of controlling crystal parameters is not particularly restricted. Specific examples thereof include controlling drawing conditions or annealing conditions of the polyolefin microporous membrane, controlling the molecular weight distribution or the branched structure of the polyolefin used for the sources and controlling the cooling rate of a gel composition in a process of producing a polyolefin microporous membrane. Normally, the lower the molecular weight of the polyolefin, the less the branched structure of the polyolefin, the stronger the drawing conditions of the microporous membrane and the lower the annealing temperature of the microporous membrane, the more the degree of crystallinity tends improve.

(Polyolefin)

Examples of the material of polyolefin microporous membrane of the present invention include polyolefins such as polyethylene, polypropylene, polymethylpentene and copolymers thereof. Among these, from the viewpoint of the strength, the heat resistance or the like, polyethylene is preferred, and a high-density polyethylene or a mixture of a high-density polyethylene and an ultra-high molecular weight polyethylene is more preferred.

Polyethylene having a weight-averaged molecular weight of from 500,000 to 5,000,000 is preferable. As the material, a polyethylene composition including 1% by mass or higher of ultra-high molecular weight polyethylene having a weight-averaged molecular weight of 1,000,000 or higher is preferred, and a polyethylene composition including from 10 to 90% by mass of ultra-high molecular weight polyethylene having a weight-averaged molecular weight of 1,000,000 or higher is more preferred.

The density of the high-density polyethylene is preferably 0.942 g/cm$^3$ (JIS K 6748-1981) or higher.

The polyolefin microporous membrane of the present invention preferably includes 90% by mass or higher of polyolefin. The polyolefin microporous membrane of the present invention may include other ingredients which do not have an effect on battery properties, and the content of the other ingredients is preferably 10% by mass or less.

(Various Properties of Polyolefin Microporous Membrane)

From the viewpoint of the energy density, the load characteristics, the mechanical strength and the handling properties of non-aqueous secondary battery, the membrane thickness of a polyolefin microporous membrane of the present invention is preferably from 5 μm to 25 μm.

From the viewpoint of the permeability, the mechanical strength and the handling properties, the porosity of a polyolefin microporous membrane of the present invention is preferably from 30 to 60%, and more preferably from 40 to 60%.

From the viewpoint of balancing between the mechanical strength and the membrane resistance, the Gurley value (JIS P8117) of a polyolefin microporous membrane of the present invention is preferably from 50 to 500 sec/100 cc.

From the viewpoint of the load characteristics of non-aqueous secondary battery, the membrane resistance of a polyolefin microporous membrane of the present invention is preferably from 0.5 to 5 ohm·cm$^2$.

From the viewpoint of the resistance to the generation of pinholes or the like and prevention of a short circuit of batteries, the thrust resistance of a polyolefin microporous membrane of the present invention is preferably 250 g or higher.

From the viewpoint of the resistance to the breakage when a separator is wound, the tensile strength of a polyolefin microporous membrane of the present invention is preferably 10 N or higher.

The shutdown temperature of a polyolefin microporous membrane of the present invention is from 130 to 150° C. The term "shutdown temperature" herein refers to the temperature at which the resistance value of the polyolefin microporous membrane becomes 10$^3$ ohm·cm$^2$. When the shutdown temperature is 130° C. or higher, a meltdown does not occur at a low temperature, which is highly safe. On the other hand, when the shutdown temperature is 150° C. or lower, safety at a high temperature can be expected. The shutdown temperature is preferably from 135 to 145° C.

From the viewpoint of balancing between the shape stability and the shutdown properties as a separator, the heat shrinkage ratio of a polyolefin microporous membrane of the present invention at 105° C. is preferably from 5 to 40%.

<Method of Producing Polyolefin Microporous Membrane>

The production method of the polyolefin microporous membrane of the present invention is not particularly restricted, and, specifically, the polyolefin microporous membrane is preferably produced through the following processes (1) to (6). Polyolefin which is used as the material is as described above.

(1) Preparation of Polyolefin Solution

A polyolefin solution in which polyolefin is dissolved in a solvent is prepared. Examples of the solvent include paraffin, liquid paraffin, paraffin oil, mineral oil, castor oil, tetralin, ethylene glycol, glycerin, decaline, toluene, xylene, diethyltriamine, ethyldiamine, dimethyl sulphoxide and hexane. Here, a mixed solvent may be used, and, from the viewpoint of controlling crystal parameters, a mixed solvent containing a volatile solvent and a nonvolatile solvent is preferred. Examples of the volatile solvent include solvents having a boiling point lower than 300° C. at atmospheric pressure, such as decaline, toluene, xylene, diethyltriamine, ethyldiamine, dimethyl sulphoxide, hexane, tetralin, ethylene glycol and glycerin. Examples of the nonvolatile solvent include solvents having a boiling point of 300° C. or higher at atmospheric pressure, such as paraffin, liquid paraffin, paraffin oil, mineral oil and castor oil. As the mixed solvent, the combination of decaline and paraffin is preferred.

The concentration of the polyolefin solution is preferably from 1 to 35% by mass, and more preferably from 10 to 30% by mass. When the concentration of polyolefin is 1% by mass or higher, a gel composition obtained by cold gelation is hard to deform since the gel composition can be maintained so as not to highly swell by the solvent, which provides good handling properties. On the other hand, when the concentration of polyolefin is 35% by mass or lower, the discharge amount can be maintained since the pressure during extrusion can be restrained, which provide excellent productivity. Orientation in the extrusion process is less likely to proceed, which has advantage in securing drawability or uniformity.

From the viewpoint above and from the viewpoint of controlling crystal parameters, in the preparation of a polyolefin solution, it is preferable to knead from 1 to 35 parts by mass of polyolefin and from 65 to 99 parts by mass of mixed solvent containing a volatile solvent and a nonvolatile solvent.

(2) Extrusion of Polyolefin Solution

The prepared polyolefin solution is kneaded with a single screw extruder or a twin-screw extruder, and extruded at a temperature equal to or greater than the melting point and no more than 60° C. higher than the melting point, through a T-die or I-die. Here, a twin-screw extruder is preferably employed.

Subsequently, the polyolefin solution extruded from the die is allowed to pass through a chill roll or a cooling bath to form a gel composition. In this case, it is preferred that the polyolefin solution be quenched to a temperature below the gelation temperature to be gelled. In particular, when a volatile solvent and a nonvolatile solvent are used in combination, from the viewpoint of controlling crystal parameters, it is preferred that the polyolefin solution be extruded through the die and then cooled at a cooling rate of from 30° C./min to 150° C./min to be gelled. The cooling rate is more preferably from 70° C./min to 130° C./min The controlling method of the cooling rate is not particularly limited, and examples thereof include a method in which, one or plural cooling apparatuses (heat roll, warm water bath, greenhouse or the like) is provided between the die and the final cooling equipment, the polyolefin solution is cooled such that the temperature gradually decreases after the polyolefin solution is extruded from the die. The "cooling rate" herein means the value (° C./min) calculated by dividing the value (° C.) obtained by subtracting the final cooling temperature (the temperature of the gel composition immediately after the gel composition allowed to pass through the final cooling apparatus) from the temperature of the die by the time (min) required for the polyolefin solution extruded from the die to pass the final cooling equipment as a gel composition which is a gelled polyolefin solution.

(3) Solvent Removal Treatment

Next, the solvents are removed from the gel composition. When a volatile solvent is used in the preparation of the polyolefin solution, the solvent can be removed from the gel composition by drying by heating or the like which is also served as a pre-heating treatment. When a nonvolatile solvent is used in the preparation of a polyolefin solution, the solvent can be removed by, for example, squeezing out by applying a pressure. It is not necessary to completely remove the solvents.

(4) Drawing of Gel Composition

After the solvent removal treatment, the gel composition is drawn. Here, prior to the drawing, a relaxing treatment may be performed. In the drawing, the gel composition is heated, and biaxially drawn at a predetermined magnification by using a normal tenter method, a roll method, a rolling method or a combination thereof. The biaxial drawing may be performed simultaneously or successively. The drawing may be performed in longitudinal multistep, or three- or four-step.

The drawing temperature is preferably 90° C. or higher and less than the melting point of the polyolefin which is used for the production, and more preferably from 100 to 120° C. When the heating temperature is less than the melting point, the gel composition is less likely to melt, which provides a good drawing. When the heating temperature is 90° C. or higher, the gel composition softens sufficiently and a drawing at a high magnification is possible without a membrane breakage during drawing.

The drawing magnification varies depending on the thickness of the original material to be drawn, and is at least two times or larger, and preferably 4 to 20 times in one axis direction. In particular, from the viewpoint of controlling crystal parameters, it is preferred that the drawing magnification be 4 to 10 times in the machine direction, and 6 to 15 times in the direction perpendicular to the machine direction.

After the drawing, a heat fixation is performed as required to provide a heat dimensional stability.

(5) Extraction and Removal of Solvent

The gel composition after drawing is immersed in an extraction solvent to extract a solvent particularly a nonvolatile solvent. Examples of extraction solvent include easily volatile solvent such as hydrocarbons such as pentane, hexane, heptane, cyclohexane, decaline and tetralin; chlorinated hydrocarbons such as methylene chloride, carbon tetrachloride and methylene chloride; fluorohydrocarbons such as trifluoroethane; and ethers such as diethyl ether and dioxane. These solvents are appropriately selected depending on the solvent which is used for preparing the polyolefin solution, particularly a nonvolatile solvent, and may be used alone or in combination. As for the extraction of the solvent, the solvent in the polyolefin microporous membrane is removed to obtain a concentration of less than 1% by mass.

(6) Annealing of Polyolefin Microporous Membrane

The polyolefin microporous membrane is heat set by annealing. The annealing temperature is preferably from 80 to 150° C. From the viewpoint of obtaining a predetermined heat shrinkage ratio, the annealing temperature is preferably from 115 to 135° C.

<Separator for Non-Aqueous Secondary Battery>

Separator for Non-Aqueous Secondary Battery of First Embodiment

The separator for a non-aqueous secondary battery of the first embodiment of the present invention is a separator for a non-aqueous secondary battery including the above-mentioned polyolefin microporous membrane and a heat resistant porous layer containing a heat resistant resin disposed on one side or both sides of the polyolefin microporous membrane.

According to such a separator for a non-aqueous secondary battery, a shutdown function can be obtained by the polyolefin microporous membrane, and at the same time, since polyolefin is retained even at a temperature higher than the shutdown temperature by the heat resistant porous layer, the meltdown is less likely to occur, whereby safety at a high temperature can be secured. Therefore, according to the separator for a non-aqueous secondary battery, a non-aqueous secondary battery having an excellent safety can be obtained.

In the separator for a non-aqueous secondary battery, from the viewpoint of energy density of a non-aqueous secondary battery, the whole membrane thickness is preferably 30 μm or smaller.

From the viewpoint of the permeability, the mechanical strength and the handling properties, the porosity of the separator for a non-aqueous secondary battery is preferably from 30 to 70%. The porosity is more preferably from 40 to 60%.

From the viewpoint of improved balance between the mechanical strength and the membrane resistance, the Gurley value (JIS P8117) of the separator for a non-aqueous secondary battery is preferably from 100 to 500 sec/100 cc.

From the viewpoint of the load characteristics of the non-aqueous secondary battery, the membrane resistance of the separator for a non-aqueous secondary battery is preferably from 1.5 to 10 ohm·cm$^2$.

The thrust resistance of the separator for a non-aqueous secondary battery is preferably from 250 to 1000 g. When the thrust resistance is 250 g or larger, pinholes or the like due to unevenness of electrodes, impact or the like are not likely to be generated when a non-aqueous secondary battery is produced, and the generation of a short circuit of the non-aqueous secondary battery can be restrained.

From the viewpoint of the resistance to the breakage when a separator is wound when producing a non-aqueous secondary battery, the tensile strength of separator for a non-aqueous secondary battery is preferably 10 N or higher.

The shutdown temperature of the separator for a non-aqueous secondary battery is preferably 130 to 155° C. When the shutdown temperature is 130° C. or higher, the meltdown does not occur at a low temperature, which is highly safe. On the other hand, when the shutdown temperature is 155° C. or lower, safety at a high temperature can be expected. The shutdown temperature is more preferably 135 to 150° C.

The heat shrinkage ratio of the separator for a non-aqueous secondary battery at 105° C. is preferably from 0.5 to 10%. When the heat shrinkage ratio is in this range, the separator for a non-aqueous secondary battery has a good balance of the shape stability and the shutdown properties. The heat shrinkage ratio is more preferably from 0.5 to 5%.

[Heat Resistant Porous Layer]

In the separator for a non-aqueous secondary battery, examples of the heat resistant porous layer include layers having a porous structure such as microporous membrane-shaped, nonwoven fabric-shaped, paper-shaped or other three-dimensional network-shaped structure. As the heat resistant porous layer, from the viewpoint of obtaining more excellent heat resistance, microporous membrane-shaped layer is preferred. The term "microporous membrane-shaped layer" herein means a layer which has a large number of micropores inside and has a structure in which these micropores are connected, wherein gases or liquids can pass from one side of the layer to the other side of the layer. The term "heat resistance" herein means characteristics in which melting or decomposition does not occur in the temperature region lower than 200° C.

The heat resistant porous layer may be disposed on both sides or one side of the polyolefin microporous membrane. From the viewpoint of the handling properties, the durability and the inhibitory effect of the heat shrinkage of the separator, the heat resistant porous layer is preferably disposed on both sides of the polyolefin microporous membrane.

When the heat resistant porous layer is formed on both sides of the polyolefin microporous membrane, the sum of the thicknesses of the heat resistant porous layers is preferably from 3 μm to 12 μm. When the heat resistant porous layer is formed only on one side of the polyolefin microporous membrane, the thickness of the heat resistant porous layer is preferably from 3 μm to 12 μm. Such a range of the membrane thickness is preferred also from the viewpoint of the liquid depletion prevention effect.

From the viewpoint of the liquid depletion prevention effect, the porosity of the heat resistant porous layer is preferably in the range of from 30 to 90%. The porosity is more preferably from 30 to 70%.

(Heat Resistant Resin)

The heat resistant resin contained in the heat resistant porous layer is preferably a polymer having a melting point of 200° C. or higher, or a polymer not having a melting point and having a decomposition temperature of 200° C. or higher. Preferred examples of such a heat resistant resin include at least one resin selected from the group consisting of fully aromatic polyamides, polyimides, polyamide imides, polysulfones, polyketones, polyetherketones, polyether imides and cellulose. In particular, from the viewpoint of the durability, fully aromatic polyamides are preferable, and from the viewpoint of the easiness of forming a porous layer and excellence in the oxidation and reduction resistance, polymethaphenylene isophthalamide which is a meta-type fully aromatic polyamide is further preferred.

(Inorganic Filler)

In the present invention, the heat resistant porous layer preferably contains an inorganic filler. The inorganic filler is not particularly limited and specific examples thereof which can be preferably used include metal oxides such as alumina, titania, silica and zirconia; metal carbonates such as calcium carbonate; metal phosphates such as calcium phosphate; and metal hydroxides such as aluminum hydroxide and magnesium hydroxide. From the viewpoint of elution of impurities and the durability, such an inorganic filler is preferably highly crystalline.

As the inorganic filler, those which undergo an endothermic reaction at a temperature of from 200 to 400° C. are preferred. In a non-aqueous secondary battery, heat generation accompanied by decomposition of a positive electrode is thought to be the most dangerous, and the decomposition occurs at about 300° C. For this reason, when the temperature at which the endothermic reaction occurs is in the range of from 200 to 400° C., the inorganic filler is effective for preventing the heat generation of the non-aqueous secondary battery.

Examples of the inorganic filler which undergoes an endothermic reaction at a temperature of from 200 to 400° C. include an inorganic filler that is a metal hydroxide, a borate compound a clay mineral or the like. Specific examples of the inorganic filler include aluminum hydroxide, magnesium hydroxide, calcium aluminate, dawsonite and zinc borate. Aluminum hydroxide, dawsonite and calcium aluminate each undergo an dehydration reaction at a temperature of 200 to 300° C.; magnesium hydroxide and zinc borate each undergo an dehydration reaction at a temperature of 300 to 400° C. Therefore, at least one of these inorganic fillers is preferably used. Among others, from the viewpoint of the effect of improving a flame resistance, the handling properties, the antistatic effect and the effect of improving the durability of a battery, metal hydroxides are preferred, and particularly, aluminum hydroxide or magnesium hydroxide is preferred.

One of the above-mentioned inorganic fillers may used singly or two or more of these may be used in combination. These flame resistant inorganic fillers can be used by mixing as appropriate other inorganic fillers, for example, metal oxides such as alumina, zirconia, silica, magnesia and titania; metal nitrides; metal carbides; and metal carbonates.

In the present invention, from the viewpoint of the anti-short circuit properties at a high temperature and the formability, the average particle size of the inorganic filler is preferably from 0.1 μm to 2 μm.

In the present invention, from the viewpoint of the effect of improving the heat resistance, the permeability and the handling properties, the content of the inorganic filler in the heat resistant porous layer is preferably from 50 to 95% by mass.

When the heat resistant porous layer is microporous membrane-shaped, the inorganic filler in the heat resistant porous layer may exist in a state where the inorganic filler is trapped in the heat resistant resin; and when the heat resistant porous layer is a nonwoven fabric or the like, the inorganic filler in the heat resistant porous layer may exist in the constituent fibers or may be fixed on the surface of the nonwoven fabric or the like by a binder such as a resin.

(Method of Forming Heat Resistant Porous Layer)

In the present invention, the method of forming a heat resistant porous layer is not particularly restricted, and the heat resistant porous layer can be formed, for example, through the following processes (1) to (5).

In order to fix a heat resistant porous layer on a polyolefin microporous membrane, the method in which the heat resistant porous layer is formed directly on the polyolefin microporous membrane by coating is preferred. Other methods such as a method in which a sheet of a separately produced heat resistant porous layer is adhered to a polyolefin microporous membrane by an adhesive or the like, or a method of thermal fusion bonding or pressure bonding can be employed.

(1) Production of Slurry for Coating

A heat resistant resin is dissolved in a solvent to produce a slurry for coating. Although the solvent may be any solvent as long as the solvent dissolves the heat resistant resin and is not particularly restricted, specifically, polar solvents are preferred, and examples thereof include N-methylpyrrolidone, dimethylacetamide, dimethylformamide and dimethyl sulphoxide. In addition to the polar solvent, a solvent which is a poor solvent to the heat resistant resin may also be used. By using such a poor solvent, a micro phase separation structure is induced, which facilitates making a porous structure when the heat resistant porous layer is formed. As the poor solvents, alcohols are preferable, and particularly, polyhydric alcohols, particularly glycols are preferable.

The concentration of the heat resistant resin in the slurry for coating is preferably from 4 to 9% by mass. As necessary, an inorganic filler is dispersed, and a slurry for coating is obtained. In the course of dispersing the inorganic filler in the slurry for coating, when the dispersibility of the inorganic filler is not favorable, a method for improving the dispersibility by the surface treatment of the inorganic filler by a silane coupling agent or the like is also applicable.

(2) Slurry Coating

A slurry is coated on at least one side of the polyolefin microporous membrane. When heat resistant porous layers are formed on both sides of the polyolefin microporous membrane, from the viewpoint of shortening the process, it is preferred that the heat resistant porous layers are coated on both sides of the substrate at the same time. Examples of a method of coating the slurry for coating include a knife coater method, a gravure coater method, Meyer bar method, a die coater method, a reverse roll coater method, a roll coater method, a screen printing method, an inkjet method and a spray method. Among these, from the viewpoint of forming the coating layer uniformly, the reverse roll coater method is suitable. When the heat resistant porous layers are coated on both sides of the polyolefin microporous membrane at the same time, for example, a method can be employed in which the polyolefin microporous membrane is allowed to pass between a pair of Meyer bars to apply an excess amount of slurry for coating on both sides, and a precise weighing is performed by allowing the resultant membrane to pass between a pair of reverse roll coater to scrape an excess amount of slurry.

(3) Coagulation of Slurry

The polyolefin microporous membrane coated with the slurry for coating is treated with a coagulation liquid capable of coagulating a heat resistant resin, whereby the heat resistant resin is coagulated to form a heat resistant porous layer.

Examples of a method of treating with a coagulation liquid include a method in which a coagulation liquid is sprayed on the surface on which slurry for coating is coated, and a method in which a polyolefin microporous membrane coated with a slurry for coating is immersed in a bath containing a coagulation liquid (coagulation bath). Here, when a coagulation bath is installed, the coagulation bath is preferably installed at a downward position with respect to the coating apparatus.

The coagulation liquid is not particularly restricted as long as the heat resistant resin can be coagulated, and is preferably water or a mixture obtained by mixing a solvent used for slurry mixed with an appropriate amount of water. Here, the amount of water mixed is preferably from 40 to 80% by mass based on the coagulation liquid. When the amount of water is 40% by mass or higher, time required for the heat resistant resin to coagulate is not too long. A portion where coagulation is not sufficient is not generated. On the other hand, when the amount of water is 80% by mass or lower, the coagulation of the surface of the heat resistant resin layer in contact with a coagulation liquid proceeds at an appropriate speed, and the surface thereof is made sufficiently porous and the degree of crystallization is appropriate. Further, the cost of recovering the solvent can be kept low.

(4) Removal of Coagulation Liquid

The coagulation liquid used for the coagulation of the slurry is removed by washing with water.

(5) Drying

Water is removed by drying from a sheet of the polyolefin microporous membrane on which a heat resistant resin coating layer is formed. The method of drying is not particularly restricted, and the drying temperature is preferably 50 to 80° C. When a high drying temperature is applied, in order to avoid generating a dimension change due to heat shrinkage, a method of allowing to be in contact with a roll is preferably applied.

Separator for Non-Aqueous Secondary Battery of Second Embodiment

The separator for a non-aqueous secondary battery of the second embodiment of the present invention is a separator for a non-aqueous secondary battery including the above-mentioned polyolefin microporous membrane and an adhesive porous layer containing a vinylidene fluoride resin disposed on one side or both sides of the polyolefin microporous membrane.

According to such a separator for a non-aqueous secondary battery, since the adhesive porous layer(s) containing a vinylidene fluoride resin is disposed on one side or both sides of the polyolefin microporous membrane, the adherence between the separator and the electrodes increases. For this reason, in addition to the mechanical strength, the shutdown properties and the liquid depletion prevention effect, the adhesive porous layer exhibits excellent ion permeability and excellent electrolyte retention. Accordingly, the cycling properties of the battery significantly improve.

[Adhesive Porous Layer]

The adhesive porous layer has a large number of micropores inside and has a structure in which these micropores are connected to each other, wherein gases or liquids can pass from one side of the layer to the other side of the layer.

The adhesive porous layer may be on both sides or one side of the polyolefin microporous membrane. From the viewpoint of preventing curling of the separator and from the viewpoint that when both sides of the separator adhere to the positive and negative electrodes respectively, the cycling properties of the battery further improve, the adhesive porous layer is preferably disposed on both sides of the polyolefin microporous membrane rather than only on one side of the polyolefin microporous membrane.

From the viewpoint of adhesiveness to the electrodes and increase in capacity of the battery, the membrane thickness of the adhesive porous layer is preferably from 1 μm to 10 μm per one side.

From the viewpoint of the ion permeability and the electrolyte retention, the porosity of the adhesive porous layer is preferably from 60 to 80%.

(Vinylidene Fluoride Resin)

The vinylidene fluoride resin contained in the adhesive porous layer is preferably at least one of (i) and (ii) below:

(i) polyvinylidene fluoride (ii) a copolymer formed by vinylidene fluoride and at least one of hexafluoropropylene, chlorotrifluoroethylene, hexafluoroethylene and ethylene.

In particular, the vinylidene fluoride resin is preferably, from the viewpoint of adhesiveness to the electrodes, a copolymer of vinylidene fluoride and hexafluoropropylene.

(Method of Forming Adhesive Porous Layer)

In the present invention, the method of forming an adhesive porous layer is not particularly restricted, and the adhesive porous layer can be formed by, for example, the wet film forming method described below. The wet film forming method is a film forming method in which a dope obtained by blend melting a vinylidene fluoride resin, an organic solvent which dissolves the vinylidene fluoride resin and which is compatible with water and a phase separating agent (gelation agent or boring agent) is coated on the polyolefin microporous membrane, and then immersed in an aqueous coagulation bath to coagulate the vinylidene fluoride resin, followed by washing with water and drying to form a porous layer. This wet film forming method is preferable because the porosity and the pore size of adhesive porous layer can be easily controlled by the composition of the dope and the composition of the coagulation bath.

As the organic solvent, any solvent can be preferably used as long as the solvent can dissolve a vinylidene fluoride resin and is compatible with water. Specific examples of the organic solvent which can be preferably selected include N-methylpyrrolidone (NMP), N,N-dimethylacetamide (DMAc), N,N-dimethylformamide (DMF), dimethyl sulphoxide (DMSO) and acetonitrile, and these may be mixed to be used. The concentration of vinylidene fluoride resin in the dope is preferably from 5 to 25% by mass.

As the phase separating agent, any agent can be used as long as the agent is a poor solvent to the vinylidene fluoride resin and compatible with water. Specific examples of the phase separating agent which can be preferably selected include water and alcohols, and in particular, specific examples of the phase separating agent which can be preferably selected include polyhydric alcohols examples thereof including propylene glycols including polymers, ethylene glycol, tripropylene glycol (TPG), 1,3-butanediol, 1,4-butanediol, polyethylene glycol monoethyl ether, methanol, ethanol and glycerin. The concentration of the phase separating agent in the dope is preferably from 0 to 60% by mass based on the mixed solvent of the organic solvent and the phase separating agent.

As the coagulation bath, a mixed liquid of water and the organic solvent and the phase separating agent used for the dope is preferably used. The percentage of water is preferably from 30 to 90% by mass. The quantitative ratio of the organic solvent and the phase separating agent is preferably set to the quantitative ratio thereof in the dope from the viewpoint of production.

In the present invention, the adhesive porous layer can also be formed by the dry film forming method described below. The dry film forming method is a film forming method in which a dope in a solution state obtained by mixing and melting a vinylidene fluoride resin, a volatile solvent which dissolves the vinylidene fluoride resin and a plasticizer is coated on a polyolefin microporous membrane, and then the volatile solvent is removed by drying, followed by extracting the plasticizer with a volatile solvent which dissolves a plasticizer and does not dissolve a vinylidene fluoride resin and drying to form a porous layer.

<Non-Aqueous Secondary Battery>

The non-aqueous secondary battery of the present invention is a non-aqueous secondary battery in which electromotive force is obtained by doping and dedoping lithium, and includes a positive electrode, a negative electrode and the above-mentioned polyolefin microporous membrane or the above-mentioned separator for a non-aqueous secondary battery. Hereinafter, both of a polyolefin microporous membrane and a separator for a non-aqueous secondary battery are referred to as "separators".

The non-aqueous secondary battery of the present invention has a structure in which a battery element in which a negative electrode and a positive electrode opposing via the separator of the present invention is impregnated with an electrolyte and the element is enclosed in an outer package. The non-aqueous secondary battery having such a constitution is excellent in safety and battery properties.

The negative electrode has a structure in which a negative electrode mixture including a negative-electrode active material, a conductive additive and a binder is formed on a collector. Examples of the negative-electrode active material include a material which is capable of electrochemically doping lithium, such as carbon materials, silicon, aluminum, tin or Wood's metal. In particular, from the viewpoint of taking advantage of the liquid depletion prevention effect due to the separator of the present invention, as the negative-electrode active material, that having a volume change of 3% or higher during the process of dedoping lithium is preferably used. Examples of such a negative-electrode active material include Sn, SnSb, $Ag_3Sn$, artificial graphite, graphite, Si, SiO and $V_5O_4$.

Examples of the conductive additive include carbon materials such as acetylene black and Ketjenblack. The binder is composed of an organic polymer(s) such as polyvinylidene fluoride or carboxymethylcellulose. As the collector, for example, a copper foil, a stainless foil, a nickel foil, or the like can be used.

The positive electrode has a structure in which a positive electrode mixture including a positive-electrode active material, a conductive agent and a binder is formed on a collector. Examples of the positive-electrode active material include lithium-containing transition metal oxides, such as $LiCoO_2$, $LiNiO_2$, $LiMn_{0.5}Ni_{0.5}O_2$, $LiCo_{1/3}Ni_{1/3}Mn_{1/3}O_2$, $LiMn_2O_4$, $LiFePO_4$, $LiCo_{0.5}Ni_{0.5}O_2$ and $LiAl_{0.25}Ni_{0.75}O_2$. In particular, from the viewpoint of taking advantage of the liquid depletion prevention effect due to the separator of the present invention, as the positive-electrode active material, that having a volume change of 1% or higher during the process of dedoping lithium is preferably used. Examples of such a positive-electrode active material include $LiMn_2O_4$, $LiCoO_2$, $LiNiO_2$, $LiCo_{0.5}Ni_{0.5}O_2$ and $LiAl_{0.25}Ni_{0.75}O_2$.

Examples of the conductive additive include carbon materials such as acetylene black and Ketjenblack. The binder is composed of an organic polymer(s) such as polyvinylidene fluoride. As the collector, for example, an aluminum foil, a stainless foil, a titanium foil or the like can be used.

The electrolyte has a constitution in which a lithium salt is dissolved in a non-aqueous solvent. Examples of the lithium salt include $LiPF_6$, $LiBF_4$ and $LiClO_4$. Examples of the non-aqueous solvent include propylenecarbonate, ethylene carbonate, dimethylcarbonate, diethylcarbonate, ethylmethylcarbonate, γ-butyrolactone and vinylene carbonate. One of These may be used singly or two or more may be used as a mixture.

Examples of the outer package include a metal can and aluminum laminated packaging. Examples of the shape of the battery include a square shape, a cylinder shape and a coin shape, and the separator of the present invention can be preferably applied to any of these shapes.

EXAMPLES

The present invention will now be described further specifically by way of the following Examples. The materials, the amount to be used, percentage, procedure or the like shown in the following Examples can be changed as appropriate, unless departing from the scope and spirit of the invention. Therefore, the scope of the present invention should not be interpreted in a restrictive way by the following specific examples.

[Measuring Method]

The measuring methods applied in the Examples of the present invention and Comparative Examples are as follows.

(1) Weight-Averaged Molecular Weight of Polyolefin

The molecular weight of the polyolefin was measured by gel permeation chromatography (GPC) below.

To 15 mg of a sample, 20 ml of a mobile phase for GPC measurement was added to dissolve the sample completely at 145° C., and then the resultant was filtrated through a stainless sintered filter (pore size: 1.0 μm). 400 μl of the filtrate was injected into the apparatus to be subjected to a measurement, and the weight-averaged molecular weight of the sample was determined.

Apparatus: Gel Permeation Chromatograph Alliance GPC2000 (manufactured by Waters)
Column: TSKgel GMH6-HT×2+TSKgel GMH6-HT×2, manufactured by Tosoh Corporation
Column temperature: 140° C.
Mobile phase: o-dichlorobenzene
Detector: Differential refractive index detector (RI)
Molecular weight calibration: Monodispersed polystyrene, manufactured by Tosoh Corporation (2) Membrane Thickness The membrane thicknesses of the polyolefin microporous membrane and the separator for a non-aqueous secondary battery were obtained by measuring the thicknesses at 20 points by a contact-type film thickness meter (manufactured by Mitutoyo Corporation) and averaging the measured values. Here, a contact probe having a cylindrical shape and a diameter of the bottom surface of 0.5 cm was used.

(3) Basis Weight

The basis weights (mass per 1 m$^2$) of the polyolefin microporous membrane and the separator for a non-aqueous secondary battery were obtained by measuring the mass of a sample cut out in 10 cm×10 cm and dividing the measured mass by the area.

(4) Porosity

The porosity of the polyolefin microporous membrane and the separator for a non-aqueous secondary battery was calculated by the following formula:

$$\epsilon = \{1 - Ws/(ds \cdot t)\} \times 100$$

Here, s is a porosity (%), Ws is a basis weight (g/m$^2$), ds is a true density (g/cm$^3$) and t is a membrane thickness (m).

(5) Gurley Value

The Gurley values of the polyolefin microporous membrane and the separator for a non-aqueous secondary battery were determined based on JIS P8117.

(6) Membrane Resistance

The membrane resistances of the polyolefin microporous membrane and the separator for a non-aqueous secondary battery were determined by the following method.

A sample having a size of 2.6 cm×2.0 cm was cut out, immersed in a methanol solution (methanol: manufactured by Wako Pure Chemical Industries, Ltd.) in which a non-ionic surfactant (EMULGEN 210P manufactured by Kao Corporation) is dissolved at a concentration of 3% by mass, and air dried. An aluminum foil having a thickness of 20 μm was cut out in 2.0 cm×1.4 cm and a lead tab was attached thereto. Two sheets of such aluminum foils were prepared and the cut out sample was sandwiched between the aluminum foils so as not to short-circuit the aluminum foils. The sample was impregnated with 1M LiBF$_4$-propylenecarbonate/ethylene carbonate (mass ratio 1/1) which is an electrolyte. The resultant was enclosed with a reduced pressure in an aluminum laminated packaging such that the tab was outside the aluminum packaging. Such cells were produced such that one, two or three sheets of separators are in the aluminum foils. The cell was placed in a thermostat bath at 20° C., and the resistance of the cell was measured by an alternating current impedance method with an amplitude of 10 mV and a frequency of 100 kHz. The measured resistance value of the cell was plotted against the number of separators, and the plots were linearly approximated to obtain the inclination. This inclination was multiplied by the electrode area, 2.0 cm×1.4 cm to obtain the membrane resistance per one sheet of separator (ohm·cm$^2$).

(7) Thrust Resistance

The thrust resistances of the polyolefin microporous membrane and the separator for a non-aqueous secondary battery were determined by performing a thrust test by using a KES-G5 handy compression tester manufactured by Kato Tech Co., Ltd. with the radius of curvature of the end of the needle of 0.5 mm and a thrust speed of 2 mm/sec, and measuring the maximum thrust load (g), which is defined as a trust resistance. Here, the sample and a packing made of silicone rubbers were inserted and fixed in a metal frame (sample holder) having a hole of Φ 11.3 mm.

(8) Tensile Strength

The tensile strengths of the polyolefin microporous membrane and the separator for a non-aqueous secondary battery were measured with a load-cell load of 5 kgf and a distance between chucks of 50 mm, using samples cut out in 10 mm×100 mm and a tensile tester (RTC-1225A manufactured by A&D Company, Limited).

(9) Crystal Parameters Measured by DSC

The polyolefin microporous membrane was cut out with a weight of 5±1 mg and the melting energy thereof was measured by using a DSC (TA-2920 manufactured by TA Instruments Japan Inc.). The DSC was performed, setting the rate of temperature increase at 2° C./min.

As shown in the formula below, the degree of crystallinity was obtained by the ratio of the melting energy measured by DSC and the theoretical melting energy of the crystal. As the theoretical melting energy, 289 J/g·K was employed.

$$(\text{degree of crystallinity}) = \{(\text{melting energy measured by DSC})/(\text{theoretical melting energy})\} \times 100$$

The ratio of the lamellar crystal was obtained in such a way that the two peaks in the DSC chart are separated and the melting energy of the peak on the lower temperature side is divided by the sum of the melting energies of the two peaks.

The crystal length was obtained by using the following Gibbs-Thomson formula. The surface energy of the crystal was 37.0×10$^{-3}$ J/m$^2$ and the equilibrium melting point was 414.5 K.

$$(\text{crystal length}) = 2 \times (\text{surface energy of crystal})/\{(\text{theoretical melting energy})/(1-\text{melting point measure by DSC/equilibrium melting point})\}$$

The amorphous length was obtained by the following formula using the above-mentioned degree of crystallinity and crystal length:

$$(\text{amorphous length}) = (\text{crystal length}) \times (100/\text{degree of crystallinity} - 1).$$

(10) Crystal Parameters Measured by X-Ray Diffractometry

The polyolefin microporous membrane was cut out in 10 mm×3 mm and a wide angle X-ray diffractometry was performed by using an X-ray analysis apparatus (RAD-B type manufactured by Rigaku Corporation).

The crystal size was calculated by the following Scherrer's formula using the half-width of a peak at around 2θ=21.3 obtained by the wide angle X-ray diffractometry.

$$(\text{crystal size})=(K\lambda)/(\beta_0 \cos \theta_B)$$

Here, K is 0.94, is an X-ray wavelength (0.1542 nm), $\beta_0$ is half-width×π/180, $\theta_B$ is a Bragg angle (2θ×π/360).

The degree of crystallinity was obtained by calculating the ratio of the sum of the integrated intensities of peaks at 2θ=about 21.3, about 23.7 and about 29.8 to the total integrated intensity.

(11) Shutdown Temperature

The shutdown temperatures of the polyolefin microporous membrane and the separator for a non-aqueous secondary battery were obtained by the following method.

A sample was punched in a circular shape having a diameter of 19 mm and immersed in a methanol solution (methanol: manufactured by Wako Pure Chemical Industries, Ltd.) in which a nonionic surfactant (EMULGEN 210P manufactured by Kao Corporation) was dissolved at a concentration of 3% by mass, and air dried. This sample was sandwiched with SUS plates having a diameter of 15.5 mm and the sample was impregnated with 1M LiBF4-propylenecarbonate/ethylene carbonate (mass ratio 1/1) (KISHIDA CHEMICAL Co., Ltd.) which is an electrolyte. The resultant was enclosed in a 2032 coin cell. A lead wire was connected to this coin cell and a thermocouple was attached thereto and the coin cell was placed in an oven. The temperature inside the coin cell was increased at a rate of temperature increase of 1.6° C./min and at the same time, the resistance of the cell was measured by an alternating current impedance method with an amplitude of 10 mV and a frequency of 100 kHz. The time point when the resistance value was $10^3$ ohm·cm$^2$ or higher was regarded as a shutdown, and the temperature at this time point was defined as a shutdown temperature.

(12) Heat Resistance

When the shutdown temperature was measured, the heat resistance of the separator for a non-aqueous secondary battery was evaluated depending on whether or not the resistance value was maintained at $10^3$ ohm·cm$^2$ or higher until the temperature of the cell became 200° C. from the occurrence of a shutdown. When the resistance value was maintained at $10^3$ ohm·cm$^2$ or higher, the heat resistance was evaluated as good (○); and when the resistance value became lower than $10^3$ ohm·cm$^2$, the heat resistance was evaluated as not good (×).

(13) Heat Shrinkage Ratio

The heat shrinkage ratios of the polyolefin microporous membrane and the separator for a non-aqueous secondary battery were determined such that the sample was heated at 105° C. for 1 hour and the measurement was performed in the machine direction.

(14) Recovery Ratio after Pressurization

The liquid depletion prevention effect of the polyolefin microporous membrane and the separator for a non-aqueous secondary battery was evaluated by measuring the recovery ratio after pressurization as shown below.

A sample having a size of 2.6 cm×2.0 cm was cut out, immersed in a methanol solution in which a nonionic surfactant (EMULGEN 210P manufactured by Kao Corporation) was dissolved at a concentration of 3% by mass, and air dried. An aluminum foil having a thickness of 20 μm was cut out in 2.0 cm×1.4 cm and a lead tab was attached thereto. Two sheets of such aluminum foils were prepared and the cut out sample was sandwiched between the aluminum foils so as not to short-circuit the aluminum foils. As the electrolyte, an electrolyte in which 1M LiBF$_4$ was dissolved in a solvent in which propylene carbonate and ethylene carbonate are mixed at a mass ratio of 1:1 was used, and the sample was impregnated with this electrolyte. The resultant was enclosed with a reduced pressure in an aluminum laminated packaging such that the tab was outside the aluminum packaging. The resistance of the cell was measured by an alternating current impedance method with an amplitude of 10 mV and a frequency of 100 kHz to obtain the resistance value (A) (ohm·cm$^2$) before pressurization. The cell was then pressurized by a plate press machine at 40 MPa for 5 minutes, followed by releasing the pressure. This procedure was repeated 5 times and the resistance value (B) (ohm·cm$^2$) of the cell in which a pressure was released after the pressurization was measured. The recovery ratio after pressurization was then calculated by the following formula. It can be said that the higher the recovery ratio after pressurization, the more excellent the liquid depletion prevention effect.

$$(\text{recovery ratio after pressurization})=\{\text{resistance value }(B)/\text{resistance value }(A)\}\times 100(\%)$$

Example 1

As a polyethylene powder, GUR2126 (weight-averaged molecular weight: 4,150,000, melting point: 141° C.) and GURX143 (weight-averaged molecular weight: 560,000, melting point: 135° C.) manufactured by Ticona were used. A polyethylene solution was produced by making the mixing ratio of GUR2126 and GURX143 20:80 (mass ratio) and dissolving them in a mixed solvent of liquid paraffin (SMOIL P-350 manufactured by Matsumura Oil Research Corp; boiling point: 480° C.) and decalin (manufactured by Wako Pure Chemical Industries, Ltd.; boiling point: 193° C.) so as to obtain an polyethylene concentration of 30% by mass. The composition of the polyethylene solution is as follows: polyethylene:liquid paraffin:decalin=30:67.5:2.5 (mass ratio).

This polyethylene solution was extruded from a die at 148° C. and cooled in a water bath to produce a gel tape (base tape). In this case, after the base tape was extruded from the die, the base tape was cooled such that the base tape was allowed to be in contact with heat rolls of 130° C. and 100° C. in sequence, and allowed to pass through a warm water baths of 80° C., 50° C. and 30° C. and the cooling rate down to 30° C. was set to 70° C./min.

The base tape was dried at 60° C. for 8 minutes and 95° C. for 15 minutes, and the base tape was drawn by biaxial drawing in which longitudinal drawing and lateral drawing were sequentially performed. Here, the longitudinal drawing was performed at a drawing ratio of 6 times at a drawing temperature of 90° C., and the lateral drawing was performed at a drawing ratio of 9 times at a drawing temperature of 105° C. After the lateral drawing, a heat fixation was performed at 130° C. Next, the resultant was immersed in a methylene chloride bath and liquid paraffin and decalin were extracted. Subsequently, the resultant was dried at 50° C. and subjected to an annealing process at 120° C., whereby a polyolefin microporous membrane was obtained. The obtained polyolefin microporous membrane had a structure in which fibril polyolefin was interlaced in a net-like shape, which constitutes micropores.

The measured results of properties of the obtained polyolefin microporous membrane (membrane thickness, basis weight, porosity, Gurley value, membrane resistance, thrust resistance, tensile strength, crystal parameters, shutdown temperature, heat shrinkage ratio, recovery ratio after pressurization) are shown in Table 1. The results of Examples 2 to 6 and Comparative Examples 1 to 9 are also shown in Tables 1 and 2.

Example 2

A polyolefin microporous membrane was obtained in the same manner as in Example 1 except that the cooling rate of the base tape was set to 120° C./min, the longitudinal drawing ratio was set to 6.5 times; and the lateral drawing ratio was set to 9.5 times.

Example 3

A polyolefin microporous membrane was obtained in the same manner as in Example 1 except that the cooling rate of the base tape was set to 80° C./min, the longitudinal drawing ratio was set to 5 times; and the lateral drawing ratio was set to 8 times.

Example 4

A polyolefin microporous membrane was obtained in the same manner as in Example 1 except that the mixing ratio of GUR2126 and GURX143 was 30:70 (mass ratio), the cooling rate of the base tape was set to 90° C./min and the heat fixation temperature was set to 135° C.

Example 5

A polyolefin microporous membrane was obtained in the same manner as in Example 4 except that the cooling rate of the base tape was set to 105° C./min, the longitudinal drawing ratio was set to 6.5 times; and the lateral drawing ratio was set to 9.5 times.

Example 6

A polyolefin microporous membrane was obtained in the same manner as in Example 4 except that the cooling rate of the base tape was set to 130° C./min, the longitudinal drawing ratio was set to 5 times; and the lateral drawing ratio was set to 8 times.

Comparative Example 1

A polyolefin microporous membrane was obtained in the same manner as in Example 1 except that the cooling rate of the base tape was set to 2° C./min, the longitudinal drawing ratio was set to 4 times; and the lateral drawing ratio was set to 4 times.

Comparative Example 2

A polyolefin microporous membrane was obtained in the same manner as in Example 1 except that the cooling rate of the base tape was set to 10° C./min, the longitudinal drawing ratio was set to 15 times; and the lateral drawing ratio was set to 15 times.

Comparative Example 3

A polyolefin microporous membrane was obtained in the same manner as in Example 4 except that the cooling rate of the base tape was set to 4° C./min, the longitudinal drawing ratio was set to 4 times; and the lateral drawing ratio was set to 4 times.

Comparative Example 4

A polyolefin microporous membrane was obtained in the same manner as in Example 4 except that the cooling rate of the base tape was set to 8° C./min, the longitudinal drawing ratio was set to 15 times; and the lateral drawing ratio was set to 15 times.

Comparative Example 5

A polyolefin microporous membrane was obtained in the same manner as in Example 1 except that the mixing ratio of GUR2126 and GURX143 was made 10:90 (mass ratio); the composition of the polyethylene solution was as follows: polyethylene:liquid paraffin:decalin=30:45:25 (mass ratio); the polyethylene solution was cooled in a water bath at 30° C. immediately after the polyethylene solution was extruded from a die at 148° C. and the cooling rate of the base tape was set to 160° C./min; the longitudinal drawing ratio was set to 5.5 times; the lateral drawing ratio was set to 11 times; and after the lateral drawing a heat fixation was performed at 125° C.

Comparative Example 6

A polyolefin microporous membrane was obtained in the same manner as in Example 1 except that the mixing ratio of GUR2126 and GURX143 was made 30:70 (mass ratio); the concentration of polyethylene was set to 25% by mass; the composition of the polyethylene solution was as follows: polyethylene:liquid paraffin:decalin=25:37.5:37.5 (mass ratio); the polyethylene solution was cooled in a water bath at 30° C. immediately after the polyethylene solution was extruded from a die at 148° C. and the cooling rate of the base tape was set to 160° C./min; the longitudinal drawing ratio was set to 5.5 times; the lateral drawing ratio was set to 11 times; and after the lateral drawing a heat fixation was performed at 125° C.

Comparative Example 7

A polyolefin microporous membrane was obtained in the same manner as in Example 1 except that the mixing ratio of GUR2126 and GURX143 was made 50:50 (mass ratio); the concentration of polyethylene was set to 21% by mass; the composition of the polyethylene solution was as follows: polyethylene:liquid paraffin:decalin=21:31.5:47.5 (mass ratio); the polyethylene solution was cooled in a water bath at 30° C. immediately after the polyethylene solution was extruded from a die at 148° C. and the cooling rate of the base tape was set to 160° C./min; the longitudinal drawing ratio was set to 5.5 times; the lateral drawing ratio was set to 11 times; and after the lateral drawing a heat fixation was performed at 125° C.

Comparative Example 8

A polyolefin microporous membrane was obtained in the same manner as in Example 1 except that the mixing ratio of GUR2126 and GURX143 was made 70:30 (mass ratio); the concentration of polyethylene was set to 17% by mass; the composition of the polyethylene solution was as follows: polyethylene:liquid paraffin:decalin=17:51:32 (mass ratio);

the polyethylene solution was cooled in a water bath at 30° C. immediately after the polyethylene solution was extruded from a die at 148° C. and the cooling rate of the base tape was set to 160° C./min; the longitudinal drawing ratio was set to 5.5 times; the lateral drawing ratio was set to 11 times; and after the lateral drawing a heat fixation was performed at 125° C.

Comparative Example 9

A polyolefin microporous membrane was obtained in the same manner as in Example 1 except that the mixing ratio of GUR2126 and GURX143 was made 30:70 (mass ratio); the concentration of polyethylene was set to 21% by mass; the composition of the polyethylene solution was as follows: polyethylene:liquid paraffin:decalin=21:31.5:47.5 (mass ratio); the polyethylene solution was cooled in a water bath at 30° C. immediately after the polyethylene solution was extruded from a die at 148° C. and the cooling rate of the base tape was set to 160° C./min; the longitudinal drawing ratio was set to 5.5 times; the lateral drawing ratio was set to 11 times; and after the lateral drawing a heat fixation was performed at 125° C.

TABLE 1

|  |  | Example 1 | Example 2 | Example 3 | Example 4 | Example 5 | Example 6 |
|---|---|---|---|---|---|---|---|
| Film thickness | μm | 12 | 11 | 13 | 12 | 11 | 13 |
| Basis weight | g/m² | 5.9 | 4.8 | 7.0 | 6.0 | 4.8 | 6.9 |
| Porosity | % | 45 | 51 | 40 | 44 | 52 | 41 |
| Degree of crystallinity (DSC) | % | 80 | 85 | 65 | 73 | 84 | 65 |
| Ratio of lamellar crystal | % | 60 | 80 | 40 | 55 | 85 | 31 |
| Crystal length | nm | 14 | 25 | 10 | 20 | 50 | 5 |
| Amorphous length | nm | 8 | 3 | 10 | 8 | 3 | 30 |
| Crystal size | nm | 13.2 | 13.5 | 12.6 | 13 | 13.5 | 12.5 |
| Degree of crystallinity (X-ray) | % | 67 | 68 | 64 | 66 | 68 | 64 |
| Gurley value | sec/100 cc | 140 | 160 | 124 | 150 | 162 | 190 |
| Membrane resistance | ohm · cm² | 1.5 | 1.4 | 1.6 | 1.5 | 1.4 | 1.6 |
| Thrust resistance | g | 360 | 370 | 390 | 327 | 254 | 380 |
| Tensile strength | N | 22 | 25 | 20 | 21 | 27 | 22 |
| Shutdown temperature | ° C. | 140 | 142 | 145 | 140 | 142 | 145 |
| Heat shrinkage ratio | % | 32 | 37 | 30 | 31 | 37 | 33 |
| Recovery ratio after pressurization | % | 85 | 82 | 80 | 85 | 83 | 84 |

TABLE 2

|  |  | Comparative Example 1 | Comparative Example 2 | Comparative Example 3 | Comparative Example 4 | Comparative Example 5 |
|---|---|---|---|---|---|---|
| Film thickness | μm | 14 | 10 | 14 | 10 | 11.5 |
| Basis weight | g/m² | 8.4 | 3.6 | 8.6 | 3.7 | 6.9 |
| Porosity | % | 33 | 60 | 32 | 59 | 36 |
| Degree of crystallinity (DSC) | % | 60 | 90 | 55 | 85 | 86 |
| Ratio of lamellar crystal | % | 90 | 50 | 87 | 53 | 86 |
| Crystal length | nm | 12 | 18 | 11 | 17 | 31 |
| Amorphous length | nm | 8 | 2 | 10 | 2 | 2 |
| Crystal size | nm | 12.4 | 14 | 12.2 | 13.9 | 13.6 |
| Degree of crystallinity (X-ray) | % | 63 | 70 | 62 | 69 | 67 |
| Gurley value | sec/100 cc | 200 | 187 | 200 | 184 | 301 |
| Membrane resistance | ohm · cm² | 2.7 | 1.4 | 2.7 | 1.4 | 2.641 |
| Thrust resistance | g | 290 | 200 | 525 | 203 | 380 |
| Tensile strength | N | 15 | 25 | 16 | 25 | 21 |
| Shutdown temperature | ° C. | 147 | 150 | 147 | 151 | 143 |
| Heat shrinkage ratio | % | 22 | 50 | 25 | 51 | 30 |
| Recovery ratio after pressurization | % | 40 | 35 | 52 | 45 | 55 |

|  |  | Comparative Example 6 | Comparative Example 7 | Comparative Example 8 | Comparative Example 9 |
|---|---|---|---|---|---|
| Film thickness | μm | 10.5 | 12 | 14.7 | 10.9 |
| Basis weight | g/m² | 6.3 | 7.1 | 7.3 | 6.0 |
| Porosity | % | 36 | 37 | 47 | 41 |
| Degree of crystallinity (DSC) | % | 87 | 64 | 63 | 86 |

TABLE 2-continued

| | | | | | |
|---|---|---|---|---|---|
| Ratio of lamellar crystal | % | 81 | 38 | 28 | 81 |
| Crystal length | nm | 26 | 8 | 4 | 16 |
| Amorphous length | nm | 4 | 15 | 31 | 4 |
| Crystal size | nm | 12.4 | 12.3 | 12.2 | 12.4 |
| Degree of crystallinity (X-ray) | % | 69 | 63 | 62 | 68 |
| Gurley value | sec/100 cc | 306 | 351 | 199 | 250 |
| Membrane resistance | ohm · cm$^2$ | 2.501 | 2.58 | 1.960 | 2.190 |
| Thrust resistance | g | 393 | 475 | 511 | 344 |
| Tensile strength | N | 25 | 24 | 26 | 22 |
| Shutdown temperature | °C. | 144 | 144 | 146 | 144 |
| Heat shrinkage ratio | % | 31 | 27 | 28 | 28 |
| Recovery ratio after pressurization | % | 60 | 68 | 65 | 69 |

Example 7

By the method below, on the polyolefin microporous membrane obtained in Example 1, a heat resistant porous layer including a heat resistant resin and an inorganic filler was disposed to produce a separator for a non-aqueous secondary battery.

As the heat resistant resin, polymethaphenylene isophthalamide (manufactured by TEIJIN TECHNO PRODUCTS LIMITED; trademark: CONEX) was employed. Polymethaphenylene isophthalamide was dissolved in a mixed solvent of dimethylacetamide (DMAc) and tripropylene glycol (TPG) (mass ratio 50:50). In this polymer solution, magnesium hydroxide (manufactured by Kyowa Chemical Industry Co., Ltd., KISUMA-5P, average particle size: 1.0 μm) was dispersed as the inorganic filler to produce a slurry for coating. The slurry for coating was prepared such that the concentration of polymethaphenylene isophthalamide was 5.5% by mass and the mass ratio of polymethaphenylene isophthalamide and magnesium hydroxide was 25:75.

Two Meyer bars were faced to each other and a proper amount of the slurry for coating was placed between them. A polyolefin microporous membrane was allowed to pass between the Meyer bars on which the slurry for coating were placed, and the slurry for coating was coated on the both sides of the polyolefin microporous membrane. Here, the clearance between the Meyer bars was set to 20 μm and the two Meyer bars both are #6 bars. After the slurry for coating was coated, the membrane was immersed in a coagulation liquid (water:DMAc:TPG=50:25:25 [mass ratio]) at 40° C., and then washed with water and dried. By this, a separator for a non-aqueous secondary battery in which the heat resistant porous layers were formed on both sides of the polyolefin microporous membrane was obtained.

The measured results of properties of the obtained separator for a non-aqueous secondary battery (membrane thickness, basis weight, porosity, Gurley value, membrane resistance, thrust resistance, tensile strength, shutdown temperature, heat resistance, heat shrinkage ratio, recovery ratio after pressurization) are shown in Table 3. The results of Examples 8 to 22 and Comparative Examples 10 to 18 are also shown in Tables 3 to 5.

Example 8

A separator for a non-aqueous secondary battery was obtained in the same manner as in Example 7 except that, as the polyolefin microporous membrane, the one produced in Example 2 was employed.

Example 9

A separator for a non-aqueous secondary battery was obtained in the same manner as in Example 7 except that, as the polyolefin microporous membrane, the one produced in Example 3 was employed.

Example 10

A separator for a non-aqueous secondary battery was obtained in the same manner as in Example 7 except that the clearance between Meyer bars was set to 7 μm.

Example 11

A separator for a non-aqueous secondary battery was obtained in the same manner as in Example 7 except that the mixing ratio of DMAc and TPG was made 40:60 (mass ratio); the clearance between Meyer bars was set to 60 μm; and a coagulation liquid having the following composition was prepared: water:DMAc:TPG=50:30:20 (mass ratio).

Example 12

A separator for a non-aqueous secondary battery was obtained in the same manner as in Example 7 except that the mixing ratio of DMAc and TPG was made 40:60 (mass ratio); the clearance between Meyer bars was set to 75 μm; and a coagulation liquid having the following composition was prepared: water:DMAc:TPG=50:30:20 (mass ratio).

Example 13

A separator for a non-aqueous secondary battery was obtained in the same manner as in Example 7 except that the mixing ratio of DMAc and TPG was made 35:65 (mass ratio); the clearance between Meyer bars was set to 60 μm; and a coagulation liquid having the following composition was prepared: water:DMAc:TPG=50:32:18 (mass ratio).

Example 14

A separator for a non-aqueous secondary battery was obtained in the same manner as in Example 7 except that the mixing ratio of DMAc and TPG was made 70:30 (mass ratio); and a coagulation liquid having the following composition was prepared: water:DMAc:TPG=50:15:35 (mass ratio).

Example 15

A separator for a non-aqueous secondary battery was obtained in the same manner as in Example 7 except that, as the polyolefin microporous membrane, the one produced in Example 4 was employed.

Example 16

A separator for a non-aqueous secondary battery was obtained in the same manner as in Example 7 except that, as the polyolefin microporous membrane, the one produced in Example 5 was employed.

Example 17

A separator for a non-aqueous secondary battery was obtained in the same manner as in Example 7 except that, as the polyolefin microporous membrane, the one produced in Example 6 was employed.

Example 18

A separator for a non-aqueous secondary battery was obtained in the same manner as in Example 15 except that the clearance between Meyer bars was set to 7 μm.

Example 19

A separator for a non-aqueous secondary battery was obtained in the same manner as in Example 15 except that the mixing ratio of DMAc and TPG was made 40:60 (mass ratio); the clearance between Meyer bars was set to 60 μm; and a coagulation liquid having the following composition was prepared: water:DMAc:TPG=50:30:20 (mass ratio).

Example 20

A separator for a non-aqueous secondary battery was obtained in the same manner as in Example 15 except that the mixing ratio of DMAc and TPG was made 40:60 (mass ratio); the clearance between Meyer bars was set to 75 μm; and a coagulation liquid having the following composition was prepared: water:DMAc:TPG=50:30:20 (mass ratio).

Example 21

A separator for a non-aqueous secondary battery was obtained in the same manner as in Example 15 except that the mixing ratio of DMAc and TPG was made 35:65 (mass ratio); the clearance between Meyer bars was set to 60 μm; and a coagulation liquid having the following composition was prepared: water:DMAc:TPG=50:32:18 (mass ratio).

Example 22

A separator for a non-aqueous secondary battery was obtained in the same manner as in Example 15 except that the mixing ratio of DMAc and TPG was made 70:30 (mass ratio); and a coagulation liquid having the following composition was prepared: water:DMAc:TPG=50:15:35 (mass ratio).

Comparative Example 10

A separator for a non-aqueous secondary battery was obtained in the same manner as in Example 7 except that, as the polyolefin microporous membrane, the one produced in Comparative Example 1 was employed.

Comparative Example 11

A separator for a non-aqueous secondary battery was obtained in the same manner as in Example 7 except that, as the polyolefin microporous membrane, the one produced in Comparative Example 2 was employed.

Comparative Example 12

A separator for a non-aqueous secondary battery was obtained in the same manner as in Example 7 except that, as the polyolefin microporous membrane, the one produced in Comparative Example 3 was employed.

Comparative Example 13

A separator for a non-aqueous secondary battery was obtained in the same manner as in Example 7 except that, as the polyolefin microporous membrane, the one produced in Comparative Example 4 was employed.

Comparative Example 14

A separator for a non-aqueous secondary battery was obtained in the same manner as in Example 7 except that, as the polyolefin microporous membrane, the one produced in Comparative Example 5 was employed.

Comparative Example 15

A separator for a non-aqueous secondary battery was obtained in the same manner as in Example 7 except that, as the polyolefin microporous membrane, the one produced in Comparative Example 6 was employed.

Comparative Example 16

A separator for a non-aqueous secondary battery was obtained in the same manner as in Example 7 except that, as the polyolefin microporous membrane, the one produced in Comparative Example 7 was employed.

Comparative Example 17

A separator for a non-aqueous secondary battery was obtained in the same manner as in Example 7 except that, as the polyolefin microporous membrane, the one produced in Comparative Example 8 was employed.

Comparative Example 18

A separator for a non-aqueous secondary battery was obtained in the same manner as in Example 7 except that, as the polyolefin microporous membrane, the one produced in Comparative Example 9 was employed.

TABLE 3

|  |  |  | Example 7 | Example 8 | Example 9 | Example 10 | Example 11 | Example 12 | Example 13 | Example 14 |
|---|---|---|---|---|---|---|---|---|---|---|
|  | Polyolefin microporous membrane used |  | Example 1 | Example 2 | Example 3 | Example 1 | Example 1 | Example 1 | Example 1 | Example 1 |
| Heat resistant porous layer | Film thickness | μm | 6 | 6 | 6 | 2 | 20 | 25 | 20 | 6 |
|  | Basis weight | g/m² | 5.1 | 5.1 | 5.1 | 2.7 | 12.2 | 13.2 | 8.4 | 8.9 |
|  | Porosity | % | 60 | 60 | 60 | 35 | 71 | 75 | 80 | 30 |
| Complex membrane | Film thickness | μm | 18 | 17 | 19 | 14 | 32 | 37 | 32 | 18 |
|  | Basis weight | g/m² | 11.0 | 9.9 | 12.1 | 8.7 | 18.2 | 19.1 | 14.4 | 14.8 |
|  | Porosity | % | 50 | 54 | 46 | 44 | 61 | 65 | 67 | 40 |
|  | Gurley value | sec/100 cc | 260 | 280 | 244 | 195 | 290 | 350 | 280 | 290 |
|  | Membrane resistance | ohm · cm² | 2.6 | 2.5 | 2.7 | 2.3 | 2.6 | 2.9 | 3.2 | 2.8 |
|  | Thrust resistance | g | 367 | 377 | 398 | 365 | 370 | 380 | 380 | 375 |
|  | Tensile strength | N | 23 | 24 | 20 | 22 | 23 | 23 | 23 | 22 |
|  | Shutdown temperature | °C. | 141 | 143 | 146 | 141 | 141 | 142 | 142 | 143 |
|  | Heat resistance | — | ○ | ○ | ○ | ○ | ○ | ○ | ○ | ○ |
|  | Heat shrinkage ratio | % | 17 | 22 | 15 | 17 | 14 | 11 | 11 | 16 |
|  | Recovery ratio after pressurization | % | 99 | 97 | 96 | 82 | 89 | 75 | 79 | 85 |

TABLE 4

|  |  |  | Example 15 | Example 16 | Example 17 | Example 18 | Example 19 | Example 20 | Example 21 | Example 22 |
|---|---|---|---|---|---|---|---|---|---|---|
|  | Polyolefin microporous membrane used |  | Example 4 | Example 5 | Example 6 | Example 4 | Example 4 | Example 4 | Example 4 | Example 4 |
| Heat resistant porous layer | Film thickness | μm | 6 | 6 | 6 | 2 | 20 | 25 | 20 | 6 |
|  | Basis weight | g/m² | 5.1 | 5.1 | 5.1 | 2.7 | 12.2 | 13.2 | 8.4 | 8.9 |
|  | Porosity | % | 60 | 60 | 60 | 35 | 71 | 75 | 80 | 30 |
| Complex membrane | Film thickness | μm | 18 | 17 | 19 | 14 | 32 | 37 | 32 | 18 |
|  | Basis weight | g/m² | 11.1 | 9.8 | 12.0 | 8.8 | 18.3 | 19.2 | 14.5 | 14.9 |
|  | Porosity | % | 49 | 55 | 47 | 43 | 61 | 65 | 67 | 39 |
|  | Gurley value | sec/100 cc | 270 | 282 | 310 | 198 | 288 | 245 | 285 | 286 |
|  | Membrane resistance | ohm · cm² | 2.6 | 2.5 | 2.7 | 2.3 | 2.6 | 2.8 | 3.5 | 2.8 |
|  | Thrust resistance | g | 334 | 259 | 388 | 340 | 352 | 355 | 350 | 345 |
|  | Tensile strength | N | 21 | 27 | 22 | 21 | 22 | 22 | 22 | 21 |
|  | Shutdown temperature | °C. | 141 | 143 | 146 | 141 | 141 | 141 | 141 | 141 |
|  | Heat resistance | — | ○ | ○ | ○ | ○ | ○ | ○ | ○ | ○ |
|  | Heat shrinkage ratio | % | 16 | 22 | 18 | 18 | 12 | 11 | 11 | 16 |
|  | Recovery ratio after pressurization | % | 99 | 97 | 98 | 82 | 89 | 75 | 79 | 85 |

TABLE 5

|  |  |  | Comp. Ex. 10 | Comp Ex. 11 | Comp. Ex. 12 | Comp. Ex. 13 | Comp. Ex. 14 | Comp. Ex. 15 | Comp. Ex. 16 | Comp. Ex. 17 | Comp. Ex. 18 |
|---|---|---|---|---|---|---|---|---|---|---|---|
|  | Polyolefin microporous membrane used |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
| Heat resistant porous layer | Film thickness | μm | 6 | 6 | 6 | 6 | 6 | 6 | 6 | 6 | 6 |
|  | Basis weight | g/m² | 5.1 | 5.1 | 5.1 | 5.1 | 5.1 | 5.1 | 5.1 | 5.1 | 5.1 |
|  | Porosity | % | 60 | 60 | 60 | 60 | 60 | 60 | 60 | 60 | 60 |
| Complex membrane | Film thickness | μm | 20 | 16 | 20 | 16 | 17.5 | 16.5 | 18 | 20.7 | 16.9 |
|  | Basis weight | g/m² | 13.5 | 8.7 | 13.6 | 8.7 | 12.0 | 11.4 | 12.2 | 12.4 | 11.1 |
|  | Porosity | % | 41 | 60 | 40 | 59 | 44 | 45 | 45 | 51 | 48 |
|  | Gurley value | sec/100 cc | 320 | 307 | 320 | 304 | 381 | 393 | 445 | 303 | 380 |
|  | Membrane resistance | ohm · cm² | 3.8 | 2.5 | 3.8 | 2.5 | 3.7 | 3.6 | 3.7 | 3.1 | 3.3 |
|  | Thrust resistance | g | 296 | 204 | 536 | 207 | 391 | 406 | 487 | 526 | 356 |
|  | Tensile strength | N | 16 | 25 | 16 | 25 | 22 | 26 | 25 | 27 | 23 |
|  | Shutdown temperature | °C. | 148 | 151 | 148 | 152 | 144 | 145 | 145 | 147 | 145 |

TABLE 5-continued

|  |  | Comp. Ex. 10 | Comp Ex. 11 | Comp. Ex. 12 | Comp. Ex. 13 | Comp. Ex. 14 | Comp. Ex. 15 | Comp. Ex. 16 | Comp. Ex. 17 | Comp. Ex. 18 |
|---|---|---|---|---|---|---|---|---|---|---|
| Heat resistance |  | — | ○ | ○ | ○ | ○ | ○ | ○ | ○ | ○ |
| Heat shrinkage ratio | % | 7 | 35 | 10 | 36 | 14 | 15 | 19 | 19 | 14 |
| Recovery ratio after pressurization | % | 60 | 65 | 62 | 60 | 66 | 79 | 73 | 67 | 78 |

Examples 23 to 44, Comparative Examples 19 to 36

Non-aqueous secondary batteries were produced by using the polyolefin microporous membranes or the separators for a non-aqueous secondary battery produced in Examples 1 to 22 and Comparative Examples 1 to 18, and the cycling properties thereof were evaluated.

(Production of Test Batteries)

—Production of Positive Electrode—

Lithium cobaltate ($LiCoO_2$, manufactured by NIPPON CHEMICAL INDUSTRIAL CO., LTD.), acetylene black (DENKA BLACK manufactured by DENKI KAGAKU KOGYOU KABUSHIKI KAISHA) and polyvinylidene fluoride (manufactured by KUREHA CORPORATION) were kneaded by using N-methyl-pyrrolidone such that the mass ratio was 89.5:4.5:6 to produce a slurry. The obtained slurry was coated on an aluminum foil having a thickness of 20 μm, dried, and then pressed, and a positive electrode having a thickness of 100 μm was obtained.

—Production of Negative Electrode—

Meso phase carbon microbeads (MCMB, manufactured by Osaka Gas Chemicals Co., Ltd.), acetylene black (DENKA BLACK manufactured by DENKI KAGAKU KOGYOU KABUSHIKI KAISHA) and polyvinylidene fluoride (manufactured by KUREHA CORPORATION) were kneaded by using N-methyl-2pyrrolidone such that the mass ratio was 87:3:10 to produce a slurry. The obtained slurry was coated on a copper foil having a thickness of 18 μm, dried, and then pressed, and a negative electrode having a thickness of 90 μm was obtained.

—Production of Battery—

Each of the polyolefin microporous membrane or the separator for a non-aqueous secondary battery produced in Examples 1 to 22 and Comparative Examples 1 to 18 was sandwiched between the positive electrode and the negative electrode respectively. The resultant was impregnated with an electrolyte and enclosed in an outer package composed of an aluminum laminate film to produce non-aqueous secondary batteries in Examples 23 to 44 and Comparative Examples 19 to 36. Here, as the electrolyte, 1M $LiPF_6$-ethylene carbonate/ethylmethylcarbonate (mass ratio 3/7) (manufactured by KISHIDA CHEMICAL Co., Ltd.) was employed. The non-aqueous secondary battery had a positive electrode area of 2×1.4 $cm^2$, a negative electrode area of 2.2×1.6 $cm^2$ and a set capacity of 8 mAh (in the range of 4.2 V-2.75 V).

(Evaluation of Cycling Properties)

On the non-aqueous secondary battery, 4.0 V of constant-current and constant-voltage charge and 2.75 V of constant-current discharge were repeated for 100 cycles and then the discharge capacity was measured. The value obtained by dividing the discharge capacity after 100 cycles by the discharge capacity after 3 cycles was defined as a discharge capacity retention (%), which was employed as an index of cycling properties. The measured results are shown in Table 6.

TABLE 6

| Battery | Separator used | Cycling properties (discharge capacity retention [%]) |
|---|---|---|
| Example 23 | Example 1 | 95 |
| Example 24 | Example 2 | 91 |
| Example 25 | Example 3 | 93 |
| Example 26 | Example 7 | 94 |
| Example 27 | Example 8 | 90 |
| Example 28 | Example 9 | 92 |
| Example 29 | Example 10 | 89 |
| Example 30 | Example 11 | 88 |
| Example 31 | Example 12 | 82 |
| Example 32 | Example 13 | 85 |
| Example 33 | Example 14 | 85 |
| Example 34 | Example 4 | 95 |
| Example 35 | Example 5 | 91 |
| Example 36 | Example 6 | 93 |
| Example 37 | Example 15 | 94 |
| Example 38 | Example 16 | 90 |
| Example 39 | Example 17 | 92 |
| Example 40 | Example 18 | 88 |
| Example 41 | Example 19 | 89 |
| Example 42 | Example 20 | 81 |
| Example 43 | Example 21 | 84 |
| Example 44 | Example 22 | 85 |
| Comp. Ex. 19 | Comp. Ex. 1 | 78 |
| Comp. Ex. 20 | Comp. Ex. 2 | 60 |
| Comp. Ex. 21 | Comp. Ex. 10 | 77 |
| Comp. Ex. 22 | Comp. Ex. 11 | 59 |
| Comp. Ex. 23 | Comp. Ex. 3 | 78 |
| Comp. Ex. 24 | Comp. Ex. 4 | 60 |
| Comp. Ex. 25 | Comp. Ex. 12 | 77 |
| Comp. Ex. 26 | Comp. Ex. 13 | 59 |
| Comp. Ex. 27 | Comp. Ex. 5 | 60 |
| Comp. Ex. 28 | Comp. Ex. 6 | 62 |
| Comp. Ex. 29 | Comp. Ex. 7 | 65 |
| Comp. Ex. 30 | Comp. Ex. 8 | 68 |
| Comp. Ex. 31 | Comp. Ex. 9 | 78 |
| Comp. Ex. 32 | Comp. Ex. 14 | 75 |
| Comp. Ex. 33 | Comp. Ex. 15 | 76 |
| Comp. Ex. 34 | Comp. Ex. 16 | 74 |
| Comp. Ex. 35 | Comp. Ex. 17 | 75 |
| Comp. Ex. 36 | Comp. Ex. 18 | 74 |

Example 45, Comparative Example 37

By the method below, on the polyolefin microporous membrane obtained in Example 1 and Comparative Example 1, an adhesive porous layer containing a vinylidene fluoride resin is disposed to produce a separator for a non-aqueous secondary battery.

A vinylidene fluoride resin having a copolymer composition of VdF/HFP/CTFE=92.0/4.5/3.5 (mass ratio) and a weight-averaged molecular weight of 410,000 was dissolved in a mixed solvent of DMAc (organic solvent):TPG (phase separating agent)=60:40 (mass ratio) such that the percentage of the resin was 12% by mass to prepare a dope.

This dope was coated on both sides of the polyethylene microporous membrane. Subsequently, the polyethylene microporous membrane on which the dope was coated was immersed in a coagulation bath to coagulate the coated layer. Here, the composition of the coagulation bath was as follows: water:DMAc:TPG=50:30:20 (mass ratio). Next, washing with water and drying were performed. By this, a separator for a non-aqueous secondary battery in which adhesive porous layers are formed on both sides of the polyolefin microporous membrane was obtained.

For the separator for a non-aqueous secondary battery obtained above, the adherence thereof was evaluated by the method below.

In the same way as in Example 23, a positive electrode and a negative electrode were produced. Between the positive electrode and the negative electrode, a separator for a non-aqueous secondary battery was sandwiched, whereby the positive electrode, the separator and the negative electrode are disposed in this order (positive electrode/separator/negative electrode). This laminate was thermally compressed at 70° C., 1 MPa for 60 seconds, and subjected to T-type peeling at 150 mm/min by using Tensilon (RTC-1210A manufactured by ORIENTEC Co., Ltd.). Setting the area of the peeling surface to 100, when the percentage of the area on which negative-electrode active material is moved to the side of the separator was 90% or larger, the adherence was evaluated as A, and when the percentage was smaller than 90%, the adherence was evaluated as B. The measured results are shown in Table 7.

TABLE 7

| | | | Example 45 | Comp. Ex. 37 |
|---|---|---|---|---|
| Polyolefin microporous membrane used | | | Example 1 | Comp. Ex. 1 |
| Adhesive porous layer | Film thickness | μm | 3.4 | 3.4 |
| | Basis weight | g/m² | 2.5 | 2.5 |
| | Porosity | % | 59 | 58 |
| Complex membrane | Film thickness | μm | 15.4 | 17.4 |
| | Basis weight | g/m² | 8.4 | 10.9 |
| | Porosity | % | 48 | 38 |
| | Gurley value | sec/100 cc | 300 | 380 |
| | Membrane resistance | ohm · cm² | 2.4 | 3.8 |
| | Recovery ratio after pressurization | % | 99 | 80 |
| | Adherence | — | A | B |

INDUSTRIAL APPLICABILITY

According to the polyolefin microporous membrane of the present invention, by controlling the degree of crystallinity, the ratio of lamellar crystal, the crystal length and the amorphous length of polyolefin, even when the polyolefin microporous membrane is complexed with a heat resistant porous layer, good mechanical strength and shutdown properties can be obtained, and electrolyte depletion can be prevented. By using the polyolefin microporous membrane of the present invention, the safety of a separator for a non-aqueous secondary battery and a non-aqueous secondary battery is secured.

The entire disclosures of Japanese Patent Application No. 2010-066116 filed on Mar. 23, 2010 and Japanese Patent Application No. 2010-066117 filed on Mar. 23, 2010 are as a whole incorporated herein by reference.

All documents, patent applications and technical specifications recited in this specification are incorporated herein by reference in this specification to the same extent as if each individual publication, patent applications and technical standard was specifically and individually indicated to be incorporated by reference.

The invention claimed is:

1. A polyolefin microporous membrane, the membrane having, when measured by X-ray diffractometry, a crystal size of from 12.5 nm to 13.5 nm and a degree of crystallinity of from 64 to 68%, the crystal size being a size of a lamellar crystal of a polyolefin in the polyolefin microporous membrane.

2. The polyolefin microporous membrane according to claim 1, which comprises a polyolefin including an ultra-high molecular weight polyethylene having a weight-averaged molecular weight of 1,000,000 or higher and a high-density polyethylene having a density of 0.942 g/cm³.

3. The polyolefin microporous membrane according to claim 1, which is produced by
   a process of preparing a polyolefin solution by kneading from 1 to 35 parts by mass of polyolefin and from 65 to 99 parts by mass of mixed solvent including a volatile solvent and a nonvolatile solvent;
   a process of forming a gel composition by extruding the polyolefin solution through a die at a temperature equal to or greater than a melting point of the polyolefin and no more than 60° C. higher than the melting point of the polyolefin, followed by cooling at a cooling rate of from 30° C./min to 150° C./min;
   a process of removing the volatile solvent from the gel composition;
   a process of drawing the gel composition; and
   a process of removing the nonvolatile solvent from the gel composition.

4. A separator for a non-aqueous secondary battery, the separator comprising:
   the polyolefin microporous membrane according to claim 1; and
   a heat resistant porous layer including a heat resistant resin disposed on one side or both sides of the polyolefin microporous membrane.

5. The separator for a non-aqueous secondary battery according to claim 4, wherein the heat resistant resin is at least one resin selected from the group consisting of fully aromatic polyamides, polyimides, polyamide imides, polysulfones, polyketones, polyetherketones, polyether imides and cellulose.

6. The separator for a non-aqueous secondary battery according to claim 4, wherein the heat resistant porous layer includes an inorganic filler.

7. The separator for a non-aqueous secondary battery according to claim 6, wherein the inorganic filler is aluminum hydroxide or magnesium hydroxide.

8. A non-aqueous secondary battery, the battery comprising a positive electrode, a negative electrode and the separator for a non-aqueous secondary battery according to claim 4 disposed between the positive electrode and the negative electrode, wherein an electromotive force is obtained by doping and dedoping lithium.

9. A separator for a non-aqueous secondary battery, the separator comprising:
   the polyolefin microporous membrane according to claim 1; and
   an adhesive porous layer including a vinylidene fluoride resin disposed on one side or both sides of the polyolefin microporous membrane.

10. The separator for a non-aqueous secondary battery according to claim 9, wherein the vinylidene fluoride resin is at least one selected from the group consisting of (i) polyvinylidene fluoride; and
(ii) a copolymer of a vinylidene fluoride and at least one selected from the group consisting of hexafluoropropylene, chlorotrifluoroethylene, hexafluoroethylene and ethylene.

11. A non-aqueous secondary battery, the battery comprising a positive electrode, a negative electrode and the polyolefin microporous membrane according to claim 1 disposed between the positive electrode and the negative electrode, wherein an electromotive force is obtained by doping and dedoping lithium.

12. A method of producing a polyolefin microporous membrane according to claim 1, the method comprising:
- a process of preparing a polyolefin solution by kneading from 1 to 35 parts by mass of polyolefin and from 65 to 99 parts by mass of mixed solvent including a volatile solvent and a nonvolatile solvent;
- a process of forming a gel composition by extruding the polyolefin solution through a die at a temperature equal to or greater than a melting point of the polyolefin and no more than 60° C. higher than the melting point of the polyolefin, followed by cooling at a cooling rate of from 30° C./min to 150° C./min;
- a process of removing the volatile solvent from the gel composition;
- a process of drawing the gel composition; and
- a process of removing the nonvolatile solvent from the gel composition.

* * * * *